US008888596B2

(12) United States Patent
Kelly et al.

(10) Patent No.: US 8,888,596 B2
(45) Date of Patent: Nov. 18, 2014

(54) SUPERSTITIOUS GESTURE INFLUENCED GAMEPLAY

(75) Inventors: Bryan M. Kelly, Alamo, CA (US);
Martin S. Lyons, Henderson, NV (US);
Stephen E. Patton, Reno, NV (US);
Daniel Savage, Henderson, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 128 days.

(21) Appl. No.: 13/207,265

(22) Filed: Aug. 10, 2011

(65) Prior Publication Data

US 2011/0306416 A1    Dec. 15, 2011

Related U.S. Application Data

(63) Continuation-in-part of application No. 12/619,635, filed on Nov. 16, 2009.

(51) Int. Cl.
*A63F 13/00* (2014.01)
*G07F 17/32* (2006.01)

(52) U.S. Cl.
CPC ............ *G07F 17/3209* (2013.01); *G07F 17/32* (2013.01)
USPC .................................. 463/37; 463/20; 463/25

(58) Field of Classification Search
CPC .......................... G07F 17/3262; G07F 17/3288
USPC .......................... 463/13, 20, 25, 27, 30, 31, 37
See application file for complete search history.

(56) References Cited

U.S. PATENT DOCUMENTS

| 6,520,856 | B1 * | 2/2003 | Walker et al. .................... 463/21 |
| 6,918,834 | B2 * | 7/2005 | Vancura ........................... 463/25 |
| 6,942,571 | B1 | 9/2005 | McAllister et al. |
| 7,578,741 | B2 | 8/2009 | Griswold et al. |
| 2003/0073490 | A1 | 4/2003 | Hecht et al. |
| 2003/0073491 | A1* | 4/2003 | Hecht et al. ...................... 463/35 |
| 2003/0216174 | A1 | 11/2003 | Gauselmann |

(Continued)

FOREIGN PATENT DOCUMENTS

| JP | 09-308768 A | 12/1997 |
| WO | 02/059868 A1 | 8/2002 |

*Primary Examiner* — Dmitry Suhol
*Assistant Examiner* — Jason Yen
(74) *Attorney, Agent, or Firm* — Brooke Quist; Marvin Hein

(57) ABSTRACT

Various embodiments disclosed herein are directed to a gesture enhanced game play system that includes a display system, a sensor system, a feedback system, and one or more computing systems. The sensor system is configured to detect at least one touch gesture when the touch gesture is at least proximate the virtual game layout. During play of the base game, when a player makes a touch gesture the touch gesture is evaluated as either a direct gameplay touch gesture or an indirect gameplay touch gesture. Each direct gameplay touch gesture relates directly to reaching an outcome of a current game. Each indirect gameplay touch gesture may be associated with a feedback system that responds to the indirect gameplay touch gestures by the player with visual, audio, and/or tactile feedback. The feedback system enables indirect gameplay touch gestures by the player to altered game parameters by modifying a hit frequency and corresponding prize pay range, enabling the player to indirectly modify the hit frequency and prize pay range by making indirect gameplay touch gestures. The sensor system is configured to detect multiple touch gestures, wherein gestures include simultaneous touches by multiple fingers, consecutive touches by a single finger, touching and sliding of a finger, touching and sliding of multiple fingers, and combinations thereof.

34 Claims, 19 Drawing Sheets

(56) References Cited

U.S. PATENT DOCUMENTS

| | | |
|---|---|---|
| 2006/0211478 A1 | 9/2006 | Walker et al. |
| 2007/0177803 A1* | 8/2007 | Elias et al. .................... 382/188 |
| 2007/0226189 A1* | 9/2007 | Piekos et al. ..................... 707/3 |
| 2008/0076507 A1 | 3/2008 | Wertheimer |
| 2008/0094371 A1 | 4/2008 | Forstall et al. |
| 2009/0118005 A1 | 5/2009 | Kelly et al. |
| 2009/0143141 A1* | 6/2009 | Wells et al. ..................... 463/37 |
| 2009/0191946 A1* | 7/2009 | Thomas et al. .................. 463/20 |
| 2009/0275399 A1 | 11/2009 | Kelly et al. |
| 2009/0280910 A1 | 11/2009 | Gagner et al. |
| 2010/0130280 A1* | 5/2010 | Arezina et al. .................. 463/20 |
| 2010/0234094 A1* | 9/2010 | Gagner et al. .................. 463/20 |

* cited by examiner

SUPERSTITIOUS GESTURE INFLUENCED GAMEPLAY

CROSS-REFERENCE TO RELATED APPLICATIONS

This application is a continuation-in-part of U.S. patent application Ser. No. 12/619,635, entitled "Gesture Enhanced Input Device," filed Nov. 16, 2009, which is incorporated herein by reference in its entirety. This application is also related to U.S. patent application Ser. No. 11/938,203, entitled "Game Related Systems, Methods, And Articles That Combine Virtual And Physical Elements," filed Nov. 9, 2007, and U.S. Provisional Application No. 60/985,178 filed Nov. 2, 2007, the content of both of which are incorporated herein by reference in their entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD

This disclosure is directed to wagering games, gaming machines, networked gaming systems and methods and, more particularly, to wagering games, gaming machines, networked gaming systems and methods having a superstitious influenced gameplay.

BACKGROUND

There are numerous types of games that people play for entertainment or educational purposes. Some games are classified as board games. Such games typically include a game layout which is defined or formed by a set of demarcations on a board. Typically, players advance game-related pieces such as tokens, tiles or markers along various paths on the game layout to obtain some goal. The goal may, for example, include being the first player to reach a destination, collecting cards, points or pretend currency, or collecting other game-related pieces such as tokens, tiles, houses, wedges, and the like. Examples of board games include chess, checkers, Monopoly, Scrabble, Trivial Pursuit, Battle Ship, Risk, Life, Candyland, Chutes And Ladders, and Go Fish.

Some games are commonly associated with wagering. For example, roulette, craps, and many card games played with playing cards, for instance blackjack, baccarat, various types of poker, Pai Gow poker, and Let It Ride. Sometimes games commonly associated with wagering are played for fun, without the exchange of money and/or for charitable fund raisers which typically involves pretend money. Card games may be played with one or more standard decks of playing cards. A standard deck of playing cards typically comprises fifty-two playing cards, each playing card having a combination of a rank symbol and a suit symbol, selected from thirteen rank symbols (i.e., 2, 3, 4, 5, 6, 7, 8, 9, 10, J, Q, K, and A) and four suit symbols (i.e., diamond-solid, and the like). Some games may include non-standard playing cards, for example, playing cards with symbols other than the rank and suit symbols associated with a standard deck.

Gaming tables have traditionally consisted of a wood structure with a printed felt and an arm pad. There are numerous games played at conventional gaming tables. For example, roulette, craps, and card games are played with playing cards. Table games have long been played on a traditional green felt table, with one or more players sitting at one side of the table and the dealer at the other side of the table standing in the casino pit area. A dealer or an electronic shuffler shuffles the decks of playing cards, which are dealt to the players one-by-one from a card deck shoe or from a hand-held deck. Players place bets or wagers on the table, typically prior to the playing cards being dealt. At the conclusion of the game, the dealer judges the hands of the various players, including in some games, the dealers own hand. If a player has a winning hand, the dealer pays the player based upon the size of the wager initially bet and any additional wagers made during game. Losing players have their wagers collected by the dealer. Then, the next round or hand of the game begins.

Pit bosses monitor the amount of wagering by identified players and manually reward players with complimentary benefits commonly referred to as "comps" credited to the player account based upon this wager rate. Often the amount of the comp is significantly off because the pit boss is concurrently monitoring several players at several different tables as well as handling different duties in the pit. This leads to the casino or player being adversely affected.

The pit boss and surveillance cameras monitor the dealer and players to ensure that they are not secretly colluding or are individually acting to defraud the casino. Keen eyes by casino personnel are the only thing that keeps the games honest and mistakes sometimes happen.

In recent years, electronic systems have been added to table games to aid in the proper "comping" of players. Typically, such systems electronically detect the size of the bet or wager played by a player. The chips used by players to place bets or wagers may be marked either optically or via wireless interrogation. Chips may be marked with a bar code or some other indicia that is either visible or non-visible to the player. Alternatively, chips may carry radio frequency identification (RFID) transponders. Machine-readable symbol readers or RFID readers recognize the bet or wager by each identified player, and the appropriate comps may be credited to the patron's account based upon the size of wagers. Also, the players overall value to the casino can be calculated since both wins and losses can be electronically monitored. Table game betting or wager recognition has become a significant focus in the casino industry as a way to properly understand total patron value. Each of these technologies has its own fidelity and resolution issues that need to be improved upon.

To aid in fraud detection, table game manufacturers have added the ability to detect the playing cards that are on the playing surface of the gaming table. Some systems read or scan the playing card as the playing cards come out of a card shoe. Others systems know the order or sequence of playing cards in the card shoe. Some systems may randomly build a card order or sequence, and then also store the order or sequence associated with the deck. Thus, when the playing cards are dealt from the card shoe, the order or sequence is pre-known by the system. Other systems read the playing cards after they are collected at the end of play or hand, and returned to a discard shoe or removed from the gaming table, for example into a holding area. The goal is to know every playing card that is dealt to each participant, including the dealer, and to look for new or fake playing cards that have been added or substituted into the game by the players or dealers. Some systems monitor all of the metrics of the games so dealer performance can be monitored. Reports may be run to see which dealers are paying out over the typical rate or paying out too much to specific players.

If the playing cards in play are known to the system, then various bonus games or awards, are electronically provided when certain triggering events occur. For example, a certain type of full house (e.g., three of a kind combined with a pair) could trigger a progressive bonus award to the player or everyone at the same gaming table as the player plays at that time. This automatic award is clearly an improvement over the manual approaches used to award players after the playing cards are shown to the dealer and the pit boss. An improved bonus game or bonus card experience that can occur in the middle of a game would be of value to players and the casino. Video card games like video poker have done this effectively over the years, and the same type of experience needs to be brought to table games.

New table games are often introduced to casino patrons. However, these games require that players are trained on the rules, or the game's risk failure. This training takes time and typically slows up wagering and hurts the casino bottom line. Some players will often avoid new table games altogether because of the associated learning curve. An improvement to the learning cycle is highly desirable.

Virtual or video-based table games could solve many of the aforementioned issues, but they have had limited success to this date. These games suffer, because the players are accustomed to the physical playing cards and chips. It is difficult for a player of traditional table games to give up the tactile feel of playing cards and chips in their hands. There is something special about holding the playing cards and lifting up the corner of a playing card to peek at the markings which makes the table game experience unique. Players enjoy seeing their playing cards come out of the card shoe and slide across the table. The pace and tease of the unknown playing cards is motivating, and almost a compelling factor for most players. A table game product that allows both the new virtual (video) and traditional physical cards and chips would give the player the best of both worlds. Also, it is desirable to improve the casino experience and operation.

Casinos and other gaming establishments are continually looking for ways to make gaming fresher and more exciting for their patrons. For example, many casinos offer the ability to place bonus wagers and/or progressive wagers. New approaches to varying existing gaming and servicing patrons are highly desirable.

The current physical button offerings, as well as the OLED button panel, requires specialized, set-up configurations to support the types of bet/line configurations, offered to our customers.

SUMMARY

Briefly, and in general terms, various embodiments disclosed herein are directed to a gesture-enhanced game play system that includes a display system, a sensor system, a feedback system, and one or more computing systems. The display system is configured to display images related to one or more games to be played on at least a first game playing surface. The images include a virtual game layout including at least one area associated with the play of the one or more games. The sensor system is configured to detect at least one touch gesture when the touch gesture is at least proximate the virtual game layout.

During play of the base game, when a player makes a touch gesture, the touch gesture is evaluated as either a direct gameplay touch gesture or an indirect gameplay touch gesture. Each direct gameplay touch gesture relates directly to reaching an outcome of a current game. Each indirect gameplay touch gesture may be associated with a feedback system that responds to the indirect gameplay touch gesture by the player with visual, audio, and/or tactile feedback. The feedback system enables indirect gameplay touch gestures by the player to altered game parameters by modifying a hit frequency and corresponding prize pay range, enabling the player to indirectly modify the hit frequency and prize pay range by making an indirect gameplay touch gesture. The one or more computing systems are communicatively coupled to the display subsystem to control the images displayed by the display system and receive information indicative of the touch gesture sensed by the sensor system. The sensor system is configured to detect multiple touch gestures, wherein gestures include simultaneous touches by multiple fingers, consecutive touches by a single finger, touching and sliding of a finger, touching and sliding of multiple fingers, and combinations thereof.

Another embodiment disclosed herein is also directed to a gesture enhanced game play system that includes a display system, a sensor system, a feedback system, and one or more computing systems. In this embodiment, the display system is configured to display images related to one or more games to be played on at least a first game playing surface. The images include a virtual game layout having at least one area associated with the play of the one or more games. The sensor system is configured to detect at least one touch gesture when the touch gesture is at least proximate the virtual game layout. During play of the base game, when a player makes a touch gesture, the touch gesture is evaluated as either a direct gameplay touch gesture or an indirect gameplay touch gesture. Each direct gameplay touch gesture relates directly to reaching an outcome of a current game. Each indirect gameplay touch gesture may be associated with a feedback system that responds to the indirect gameplay touch gesture from the player by altering the speed of the current game. The computing system is communicatively coupled to the display system to control the images displayed by the display system and receive information indicative of the touch gesture sensed by the sensor system. The sensor system is configured to detect multiple touch gestures, wherein gestures include simultaneous touches by multiple fingers, consecutive touches by a single finger, touching and sliding of a finger, touching and sliding of multiple fingers, and combinations thereof.

Yet another embodiment disclosed herein is also directed to a gesture-enhanced game play system that includes a display system, a sensor system, a feedback system, and one or more computing systems. In this embodiment, the display system configured to display images is related to one or more games to be played on at least a first game playing surface. The images include a virtual game layout including at least one area associated with the play of the one or more games. The sensor system is configured to detect at least one touch gesture when the touch gesture is at least proximate the virtual game layout.

During play of the base game, when a player makes a touch gesture, the touch gesture is evaluated as either a direct gameplay touch gesture or an indirect gameplay touch gesture. Each direct gameplay touch gesture relates directly to reaching an outcome of a current game. Each indirect gameplay touch gesture may be associated with a feedback system that responds to the indirect gameplay touch gestures by the player with visual, audio, or tactile feedback. The computing system is communicatively coupled to the display system to control the images displayed by the display system and receives information indicative of the touch gesture sensed by the sensor system. The sensor system is configured to detect multiple touch gestures, wherein gestures include simultaneous touches by multiple fingers, consecutive touches by a single finger, touching and sliding of a finger, touching and sliding of multiple fingers, and combinations thereof.

Other features and advantages will become apparent from the following detailed description, taken in conjunction with the accompanying drawings, which illustrate by way of example, the features of the various embodiments.

DETAILED DESCRIPTION

Figure 1:
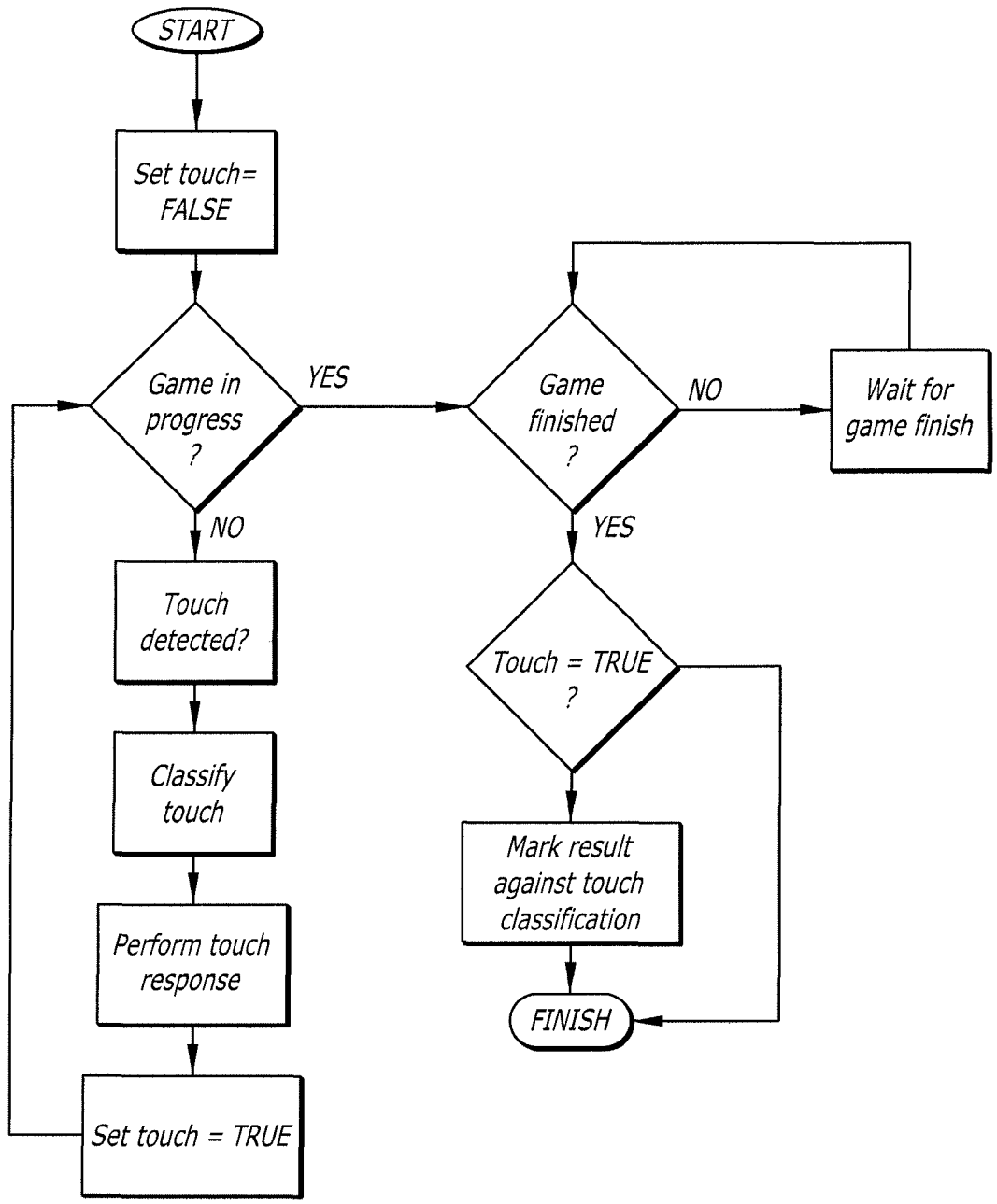
FIG. 1 illustrates a logical flow diagram of a process for gesture logging of a player's superstitious touch gesturing behavior.

In the following description, certain specific details are set forth in order to provide a thorough understanding of various disclosed embodiments. However, one skilled in the relevant art will recognize that embodiments may be practiced without one or more of these specific details, or with other methods, components, materials, and the like. In other instances, well-known structures associated with servers, networks, displays, media handling and/or printers have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

As used herein the term "physical" refers to tangible elements associated with a game. Such elements may take a variety of forms, including but not limited to playing cards, chips, dice, tiles, spinners, tokens or markers, for instance, chess pieces, checker pieces, pieces that represent players, houses in Monopoly, ships in Battleship, wedges in Trivial Pursuit, and the like. As used herein, the term "virtual" refers to a logical construct of an element associated with a game and a visual display of the logical construct, where there is no physical counterpart to the particular element in use in the game as the game is being played. For example, a virtual game layout refers to the logical construct of a layout of a game and the visual display of the game layout (e.g., demarcations typically found on a board or felt). As another example, a virtual playing card refers to the logical construct of a playing card which does not represent a physical playing card dealt or drawn in the game. As another example, a virtual chip refers to the logical construct of a monetary value which does not represent a physical chip placed as a wager in the game. As used herein the term, "representation," or "visual representation" refers to a visual display of an icon or other graphical element that is representative of a physical object associated with a game. For example, a visual icon may be displayed representing a physical playing card, physical chip or physical dice that are in use in the game.

Referring now to the drawings, wherein like reference numerals denote like or corresponding parts throughout the drawings and, more particularly to FIGS. 1-9, there are shown various embodiments of a system for data management and collection. In some embodiments, a superstitious gesture-influenced gaming system 100 provides methods of actively responding to a player's superstitious behavior. It has been widely noted that a substantial number of players interact with gaming machines in a superstitious manner. On any given visit to a casino, it is possible to see players rubbing the gaming machine monitors, or touching symbols for good luck. In some embodiments, a superstitious gesture-influenced gaming system 100, this behavior is encouraged and used to affect the visual, and other appropriate circumstances, or operational behavior of a gaming machine.

One aspect of the superstitious gesture-influenced gaming system 100 utilizes 3-D accelerated graphics hardware. Such 3-D graphics may be built from 3-D elements (such as cubes, spheres and more complex structures). However, in the superstitious gesture-influenced gaming system 100 there is no requirement for a game to be intentionally designed for 3-D. Instead, the superstitious gesture-influenced gaming system 100 takes a final 2-D output of a game, which is normally rendered directly to the LCD display, and further modifies the output in a 3-D manner. In this manner, the 2-D output may be generated by either 2-D composition or 3-D composition, as both produce a final 2-D output for display.

Figure 2:
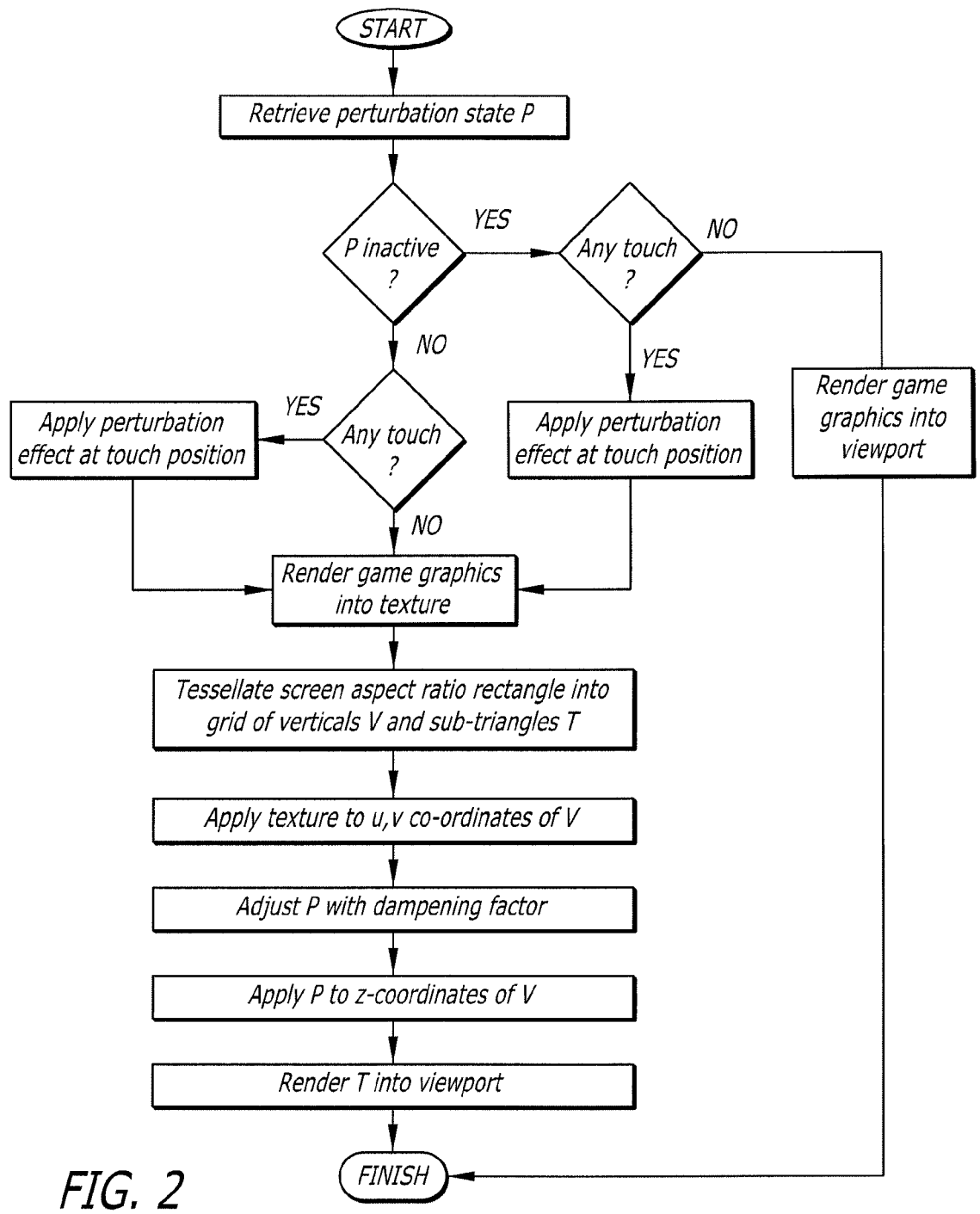
FIG. 2 illustrates a logical flow diagram of a process for distortion of game output in reaction to a player's superstitious touch-gesturing behavior.

Referring now to FIG. 2, a process for producing a superstitious gesture-influenced gaming system 100 is shown. Firstly, the software keeps a state of perturbation (P). This is the current state of any previous effect that has been applied. As shown in one example in FIGS. 3-6, the desired effect causes a ripple 310 to appear, centered on their touch, if a player touches the screen. This ripple 310 spreads outwardly, dampening and eventually disappearing. This pleasing effect gives the appearance to a player that they are affecting the graphical output. The player may further expect a superstitious correlation to be achieved. For example, players may conclude that a subsequent win was associated with the ripple effect.

In one embodiment of the superstitious gesture-influenced gaming system 100, if there is no perturbation effect active and there is no active touch on the touchscreen associated with the game output display, then the game graphics are rendered as normal. In another embodiment of the superstitious gesture-influenced gaming system 100, if there is an active touch, then a perturbation effect is applied at the touch position. In the case of a "ripple" effect, this means applying a velocity in the z-axis at the point of touch to the perturbation state.

Continuing, in still another embodiment of the superstitious gesture-influenced gaming system 100, if there are any velocities present throughout the perturbation state (either from a current touch or a previous "touch event" resulting in a ripple), then the effect is considered to be active. In such an embodiment, the conventional game graphics (instead of being rendered to the display buffer) are rendered to an intermediate texture buffer stored in the graphics card video memory. This may mean decoupling the display buffer from the display output and instead using this display buffer as a texture source for rendering at the next stage. The process of rendering the conventional game graphics into this buffer may be performed by the existing graphics subsystem of the game software.

Figure 5:
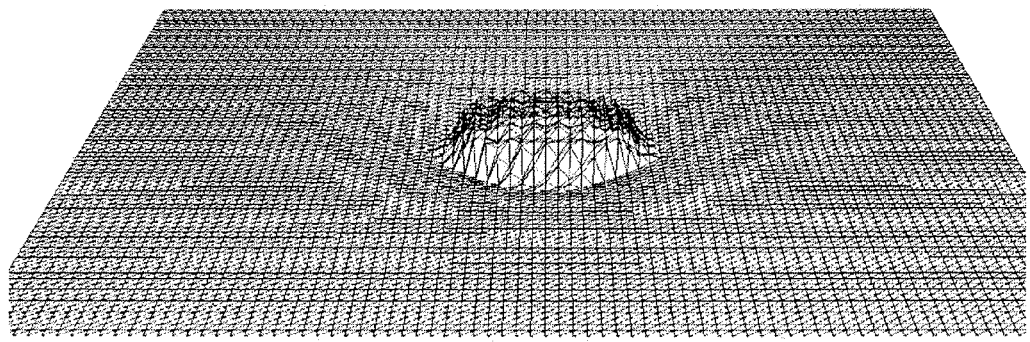
FIG. 5 illustrates a ripple distortion in reaction to a touch event from a player's superstitious touch-gesturing behavior, shown in a 3-dimensional, wire-frame representation.

After the graphics are rendered into a texture in the superstitious gesture-influenced gaming system 100, they must still be displayed on screen, albeit, affected by the perturbation state. Initially, a grid of rectangles is defined, each composed of two triangles. This grid is a tessellation of the larger display output (i.e., the grid is completely covered by non-overlapping triangles), so each rectangle within may be the same aspect ratio of the LCD display (e.g., 16:9 for a widescreen monitor), and each rectangle may be thought of as a smaller tile making up the larger overall display. The granularity of the tessellation is chosen to be as high as possible without compromising "real time" graphics performance. The maximum tessellation is typically the native resolution of the LCD display (e.g., 1920×1080 rectangles). In this scenario, each rectangle represents one pixel on the display output. FIG. 5 displays an example tessellation, rendered as wire-frame triangles.

Once the grid of vertices and triangles is defined, suitable texture co-ordinates are defined. In such an embodiment, each of these co-ordinates matches the corresponding position in the game output display with respect to the larger rectangle. Otherwise stated, if a grid of 192 by 108 rectangles was chosen for a display of 1920×1080 pixels, each texture co-ordinate would represent the corner of a 10×10 pixel tile, allowing the 3-D graphics hardware to render the intermediate texture pixels within the tile from the texture buffer. At this point, the tessellated grid of rectangles, if rendered, exactly matches the original game display output. By applying the perturbation effect, the output is altered.

In some embodiments of the superstitious gesture-influenced gaming system 100, the perturbation effect is achieved by ripple method such as described by the code below. In such an embodiment, the perturbation state consists of two grids of velocities at the same resolution as the tessellation. When a touch occurs, a velocity is added to the closest matching point in the grids to the pixel touched (or averaged across the nearest points). Then, the state is updated on every frame of graphics refresh by the following algorithm:

```
for y := 1 to height – 1
    for x := 1 to width – 1
        new-water[y][x] = ((old-water[y–1][x] +
            old-water[y+1][x] +
            old-water[y][x-1] +
            old-water[y][x+1]) / 2) –
            new-water[y][x])
        new-water[y][x] -= new-water[y][x] / 16
    end
end
```

In the above algorithm 'new-water' and 'old-water' are the two grids of velocities. After every refresh, the grids are swapped (so new-water becomes old-water, and old-water becomes new-water). The effect of this algorithm is to cause an initial touch to ripple a velocity throughout the grid. This velocity grid is then in-turn applied to the z-co-ordinates of the corresponding vertices of the rectangles in the tessellation grid.

Notably, some embodiments of the superstitious gesture-influenced gaming system 100, if a player makes a further touch to the screen, or even more importantly, makes a gesture by dragging their finger across the screen, these touches are fed into the perturbation state while it is still active. Otherwise stated, the visual effect to the player may be seen in the associated movie file.

Figure 3:
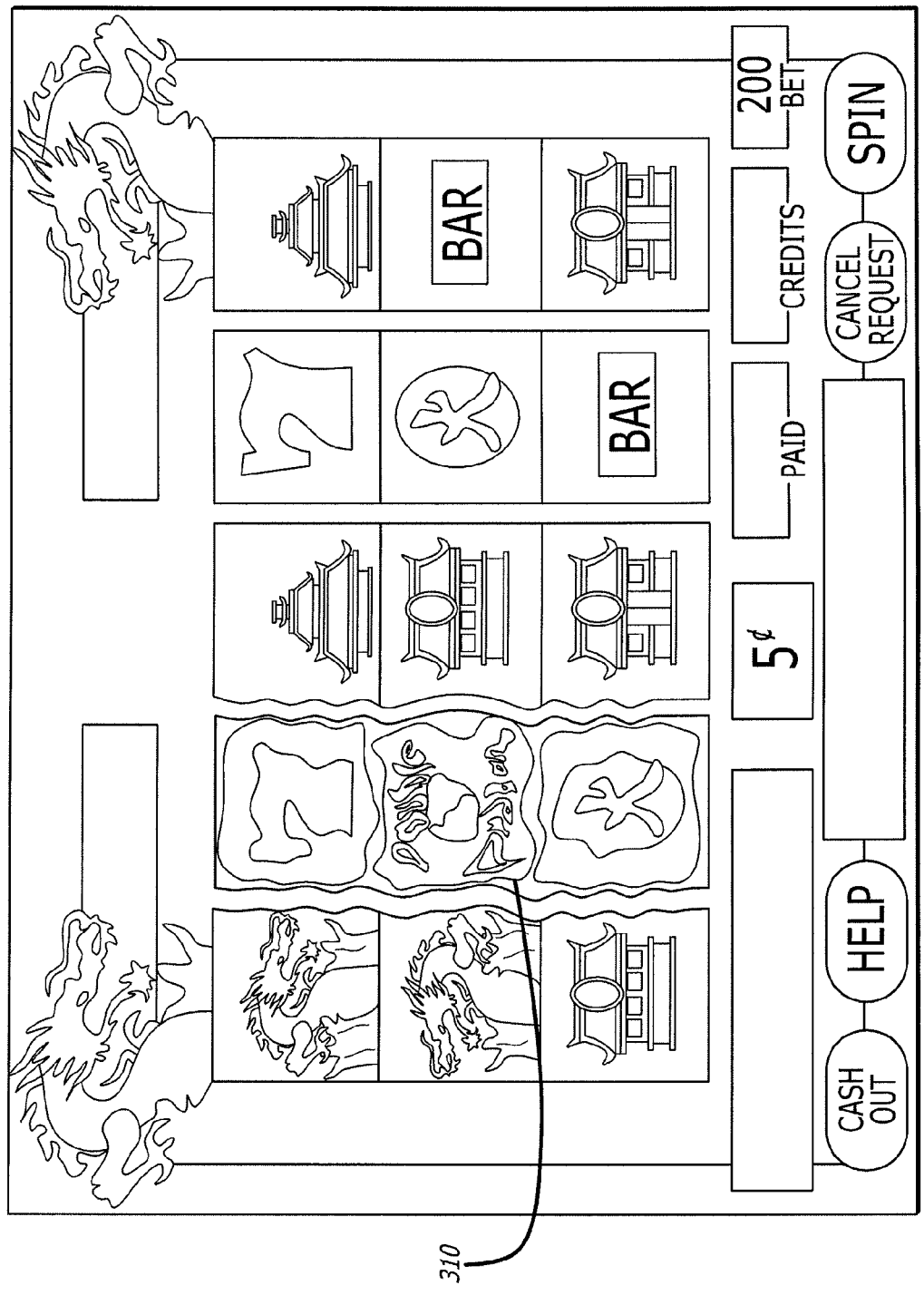
FIG. 3 illustrates a ripple distortion in reaction to a touch event from a player's superstitious touch-gesturing behavior, shown on a game display screen.
Figure 4:
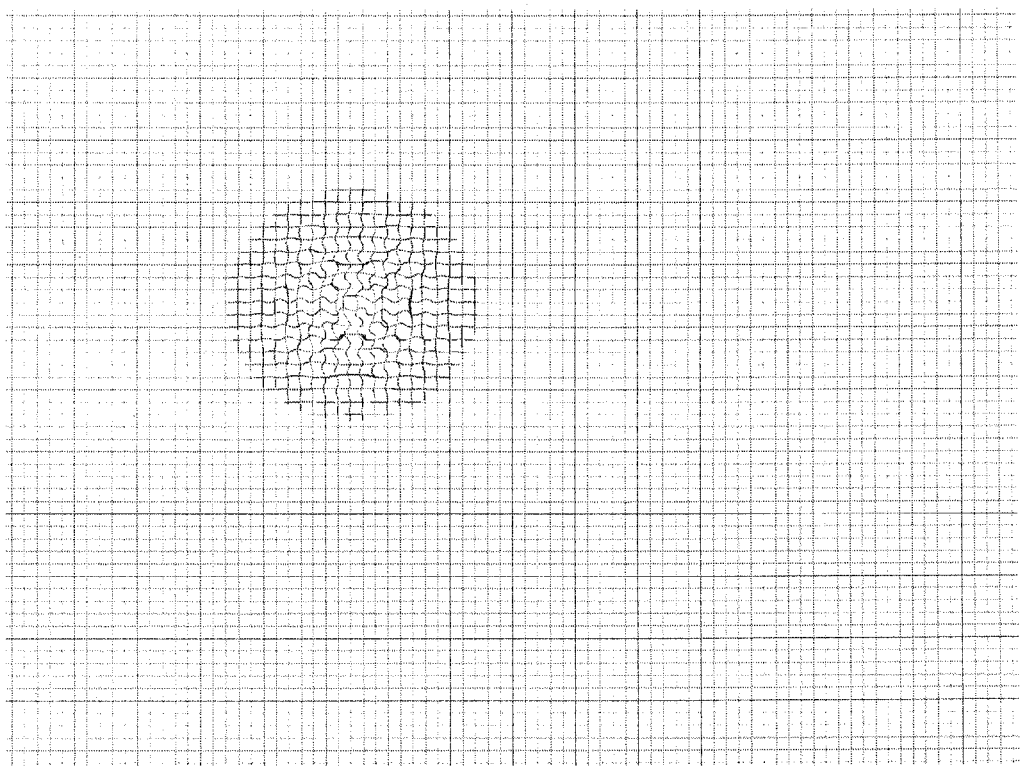
FIG. 4 illustrates a ripple distortion in reaction to a touch event from a player's superstitious touch-gesturing behavior, shown in a 2-dimensional, wire-frame representation.
Figure 6:
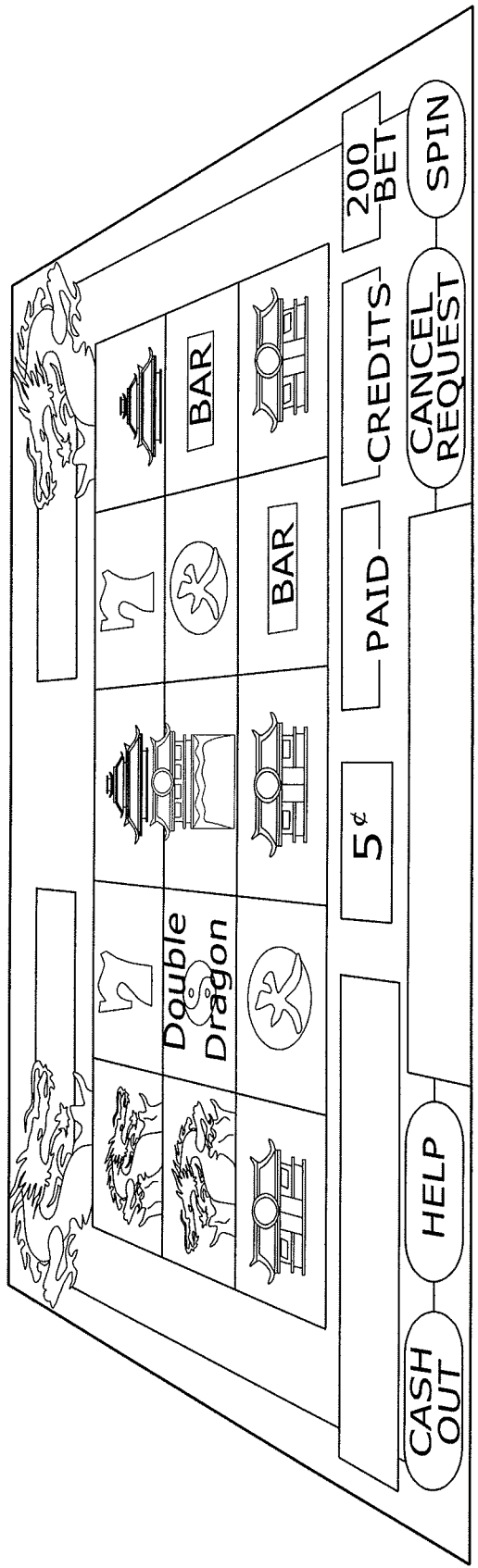
FIG. 6 illustrates a ripple distortion in reaction to a touch event from a player's superstitious touch-gesturing behavior, shown on a game display screen in a 3-dimensional representation.

Continuing, once all of the rectangles in the tessellation grid are correctly modified, each of the triangles that compose the rectangles are rendered into the 2-D display using conventional 3-D graphics rendering techniques. An example of the result of a "touch event" is shown in FIG. 3, and a corresponding wire-frame view of this example is shown in FIG. 4. Additionally, FIG. 5 shows the wire-frame from a different perspective, to show the effect on the z-coordinates (which may not be apparent from FIG. 4). To provide further clarification, FIG. 6 shows FIG. 5 as rendered with textures.

Figure 7:
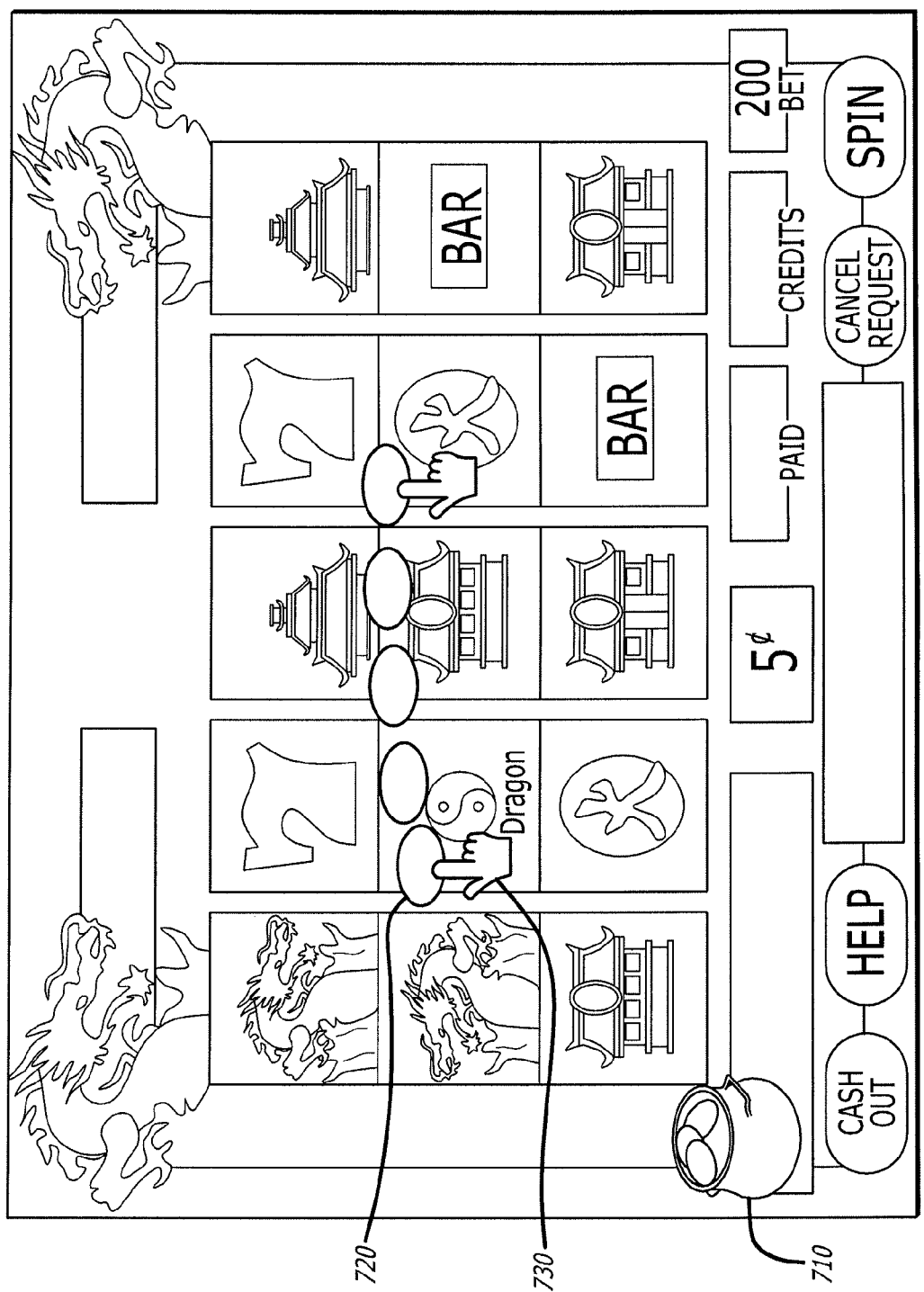
FIG. 7 illustrates a player modification of a display in reaction to a touch event from a player's superstitious touch-gesturing behavior that involves the placing of lucky elements.

Adding a ripple or other effect to the display is only one possible interaction that a player could have with a display screen in a superstitious gesture-influenced gaming system 100. FIG. 7 shows a "pot of gold" icon 710 that is active, possibly under player preference, or if a player qualifies by some criteria, such as being an elite member of the casino loyalty system. In one embodiment, a player may touch a "pot of gold" icon 710 to produce a coin 720, which they can drag and leave anywhere on the screen (indicated in FIG. 7 by the hand icon 730). While a gold coin 720 is shown in this embodiment, any appropriate icon may be used. This technique enables players to believe, for example, that they may influence a game output in the same way that table players may believe that leaving lucky "charms" on top of their stacks of chips is beneficial to their luck.

Figure 8:
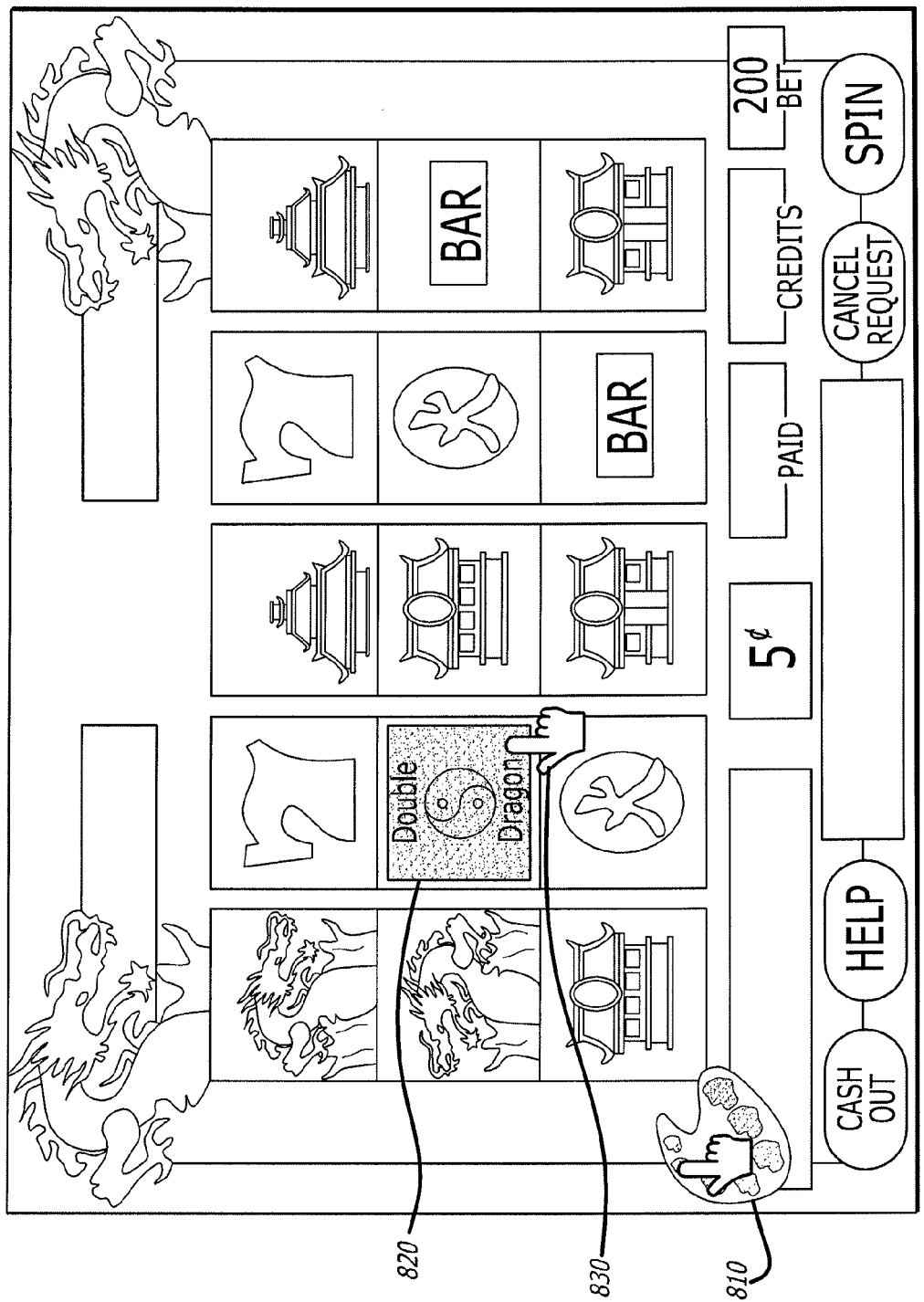
FIG. 8 illustrates a player modification of a display in reaction to a touch event from a player's superstitious touch-gesturing behavior that involves coloring symbols.

FIG. 8 shows another method of employing a superstitious gesture-influenced gaming system 100 that enables a player to influence a game display in a purely decorative manner. In one such example, a player obtains or is given access to an art palette 810, which enables the player to select a color, and use it to color areas of the screen 820. In one non-limiting example, the player selects the color red (as indicated by the hand icon 830 on the left) and then touches the area of the screen 820 which they wish to color over. As can be seen in this example, the coloring is semi-transparent and does not prevent the player from seeing the underlying symbol graphics. To prevent players drawing graffiti, in some embodiments the players may only be able to color one area, or only large (e.g., symbol size) areas at a time. Other coloring alternatives may involve a player that sprinkles "fairy dust" or other lucky elements over a symbol.

In both of the above-described embodiments, the "coloring" or "lucky icons" may only stay active for a short period of time (e.g., for one spin of the game), or they may stay active for longer before gradually fading away. This encourages the player to replenish the coloring or icons periodically.

The superstitious gesture-influenced gaming system 100 may also be implemented in association with another known superstitious behavior, which is displayed when players try to see patterns in game results. The superstitious gesture-influenced gaming system 100 leverages this behavior by providing feedback to players to help them correlate superstitious gesture input with game results.

FIG. 1 shows a process of how this may be achieved using the superstitious gesture-influenced gaming system 100. This process runs independently of the earlier-described process shown in FIG. 2. Outside of the game cycle (i.e., when the gaming machine is idle), touches on the touch screen are detected. These touches may be classified, first as meaningful or non-meaningful. Meaningful touches are defined as those where a player has touched a functional graphic such as a menu button. Typically, meaningful touches directly effect an aspect of a game play or game-related activity (e.g., selecting cards to play or discard, selecting a payline, selecting a bet amount, using a help button, using an information button, and the like). These types of touches are usually not utilized by the superstitious gesture-influenced gaming system 100, as they are not superstitious in nature.

Non-meaningful touches may be superstitious, so they are classified according to where the "touch event" occurred. Non-meaningful touches do not directly affect game play, but may affect game parameters (e.g., changing the volatility of the game (hit frequency and prize range), changing the speed of the game, and the like) or may provide feedback to the player (e.g., visual, audio, tactile, and the like). Example of visual feedback may include the appearance of ripples, colors, symbols, animated effects, and the like, in response to the non-meaningful (superstitious) touches. This classification may be according to the symbol touched, the general area of the screen touched (e.g., top or bottom), or other elements (such as non-functional graphics). In the examples shown in FIGS. 7-9, the Dragon graphical elements at the top of the screen may be classified independently. In addition to discrete touches, gestures composed of multiple touches may be classified. So a player drawing an X over a symbol may produce a different classification than a player drawing a circle. These gestures may be detected using well known means such as the methods used by the public "Gestikk" library.

In one embodiment of the superstitious gesture-influenced gaming system 100, after classification of a touch event, a touch response is performed. The process shown in FIG. 2 provides such an example, in which the touch or gesture is logged. At the end of the game cycle, or upon the point when the game result is available, the touch event is examined. If a touch or gesture was present, then the classification is added to a database table along with the game result. The database table logs the correlation between positive game results and particular gestures or touches. In this manner, the data in this table may then be used to present interesting statistical information to players in a meaningful way.

Figure 9:
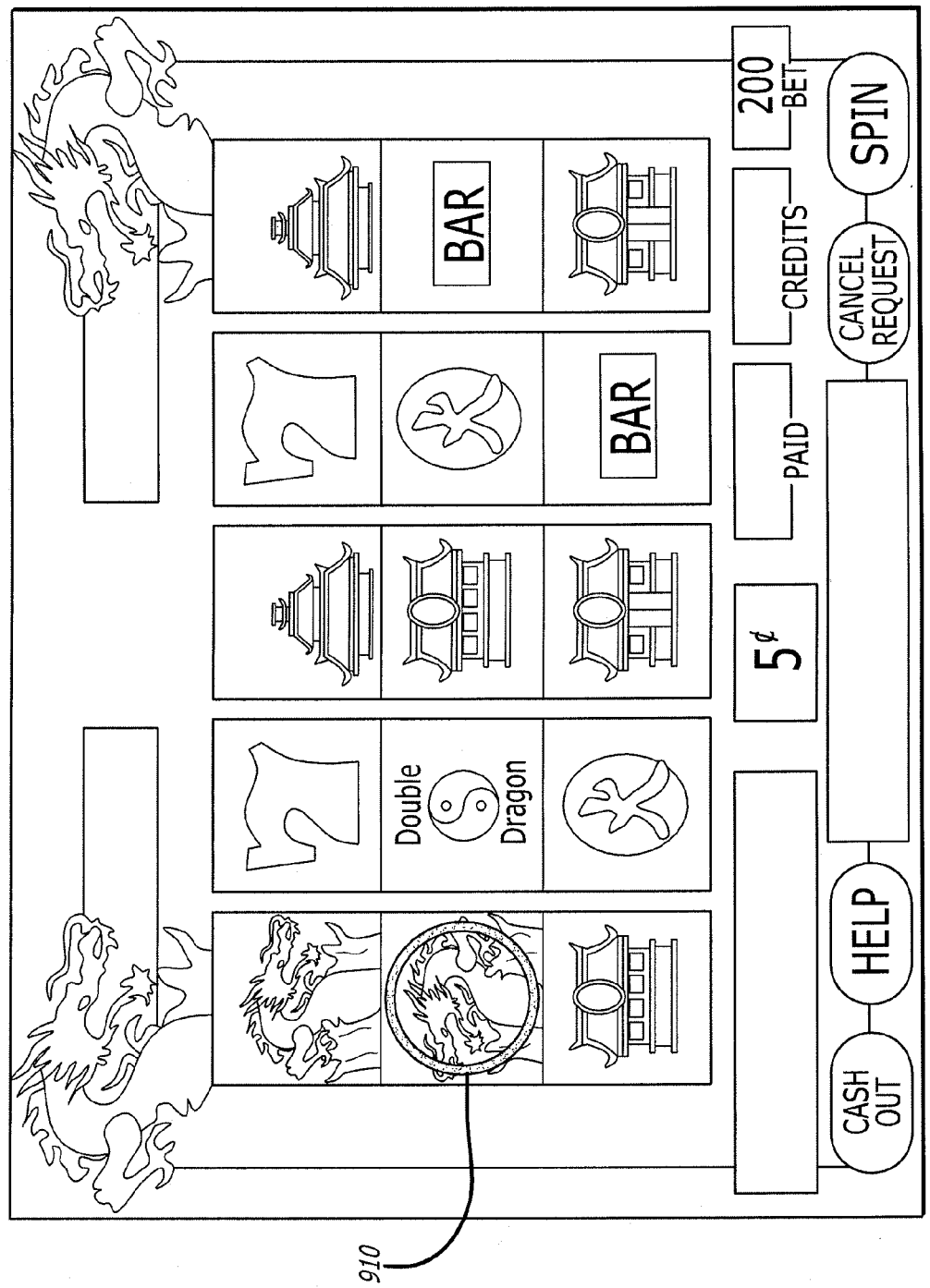
FIG. 9 illustrates a player modification of a display in reaction to a touch event from a player's superstitious touch-gesturing behavior that involves highlighting of the "luckiest" symbol positions.

FIG. 9 shows another example of how it may be represented in the superstitious gesture-influenced gaming system 100. In this example, a symbol has been subtly highlighted with a red circle 910. This circle 910 indicates to the player where there have been the "hottest" gestures. Accordingly, if a player has made touches or gestures over several symbol positions during idle mode (over the last hour or so), or even during the game cycle, then the red circle 910 is placed over the classification associated with the highest amount of wins. In this example, the classification is the middle symbol in the first reel. Continuing, the red circle 910 is placed over a symbol position, but it may be seen that classification may also be performed by symbol type, irrespective of the position of the symbol on screen. Furthermore, a particular type of symbol (e.g., the "Bar" symbol) may be presented as the "hottest" symbol touched. Additionally, if it is possible to track a player between sessions, by either a player tracking card or another state saving method, then the table of classifications may persist and allow a player to see which symbols or areas of screen have been the most lucky to touch, on a per-machine or per-game basis.

In the embodiments of the superstitious gesture-influenced gaming system 100, the player gesture or touch has no effect on the actual game performance. However, in another embodiment, a parameter that may be changed upon gesture without affecting the return-to-player percentage is game volatility. In this regard, below is a simple pay table for a game. One of ordinary skill in the art will appreciate that this method may apply to games of additional complexity.

Pay Table

| Label | Combination | Prize |
| --- | --- | --- |
| A | 3 Sevens | 500 |
| B | 3 bars | 100 |
| C | 3 bells | 50 |

-continued

| Label | Combination | Prize |
|---|---|---|
| D | 3 plums | 20 |
| E | 3 oranges | 15 |
| F | 3 cherries | 10 |
| G | 2 cherries | 5 |
| H | 1 cherry | 2 |

Using the above pay table, also presume that the symbol distribution on the three reels of the game is as follows:

Symbol Distribution 1

| | | | |
|---|---|---|---|
| Seven | 1 | 1 | 1 |
| Bar | 1 | 1 | 1 |
| Bell | 3 | 4 | 4 |
| Plum | 3 | 3 | 1 |
| Orange | 4 | 4 | 4 |
| Cherry | 5 | 2 | 3 |
| Blank | 3 | 5 | 6 |
| Total | 20 | 20 | 20 |

From the symbol distribution and pay table, the probability of a combination occurring may be calculated. This is the function P(X), where X is the line in the pay table, and the expected return to the player for this combination occurring for any given spin is E(X). These values are shown in the below table:

Probabilities for Symbol Distribution 1

| | Probability | | Expected Return |
|---|---|---|---|
| P(A) | 0.000125 | E(A) | 0.0625 |
| P(B) | 0.000125 | E(B) | 0.0125 |
| P(C) | 0.006 | E(C) | 0.12 |
| P(D) | 0.001125 | E(D) | 0.05625 |
| P(E) | 0.008 | E(E) | 0.12 |
| P(F) | 0.00375 | E(F) | 0.0375 |
| P(G) | 0.02125 | E(G) | 0.10625 |
| P(H) | 0.225 | E(H) | 0.45 |
| ΣP | 0.265375 | ΣE | 0.965 |

The total of the expected returns is 0.965, or a 96.5% return to player. The total of the probabilities is the probability of a win in any spin, which is 0.265 or approximately 1 in 4 spins. For the superstitious gesture-influenced gaming system 100, there is also an alternative symbol distribution, but with an identical pay table:

Symbol Distribution 2

| | | | |
|---|---|---|---|
| Seven | 3 | 1 | 1 |
| Bar | 1 | 2 | 1 |
| Bell | 3 | 4 | 4 |
| Plum | 3 | 3 | 1 |
| Orange | 4 | 3 | 4 |
| Cherry | 1 | 1 | 6 |
| Blank | 5 | 4 | 3 |
| Total | 20 | 20 | 20 |

The below probabilities are calculated from this symbol distribution:

Probabilities for Symbol Distribution 2

| | Probability | | Expected Return |
|---|---|---|---|
| P(A) | 0.001125 | E(A) | 0.5625 |
| P(B) | 0.00025 | E(B) | 0.025 |
| P(C) | 0.006 | E(C) | 0.12 |
| P(D) | 0.001125 | E(D) | 0.05625 |
| P(E) | 0.006 | E(E) | 0.09 |
| P(F) | 0.00075 | E(F) | 0.0075 |
| P(G) | 0.00175 | E(G) | 0.00875 |
| P(H) | 0.0475 | E(H) | 0.095 |
| ΣP | 0.0645 | ΣE | 0.965 |

In this embodiment of the superstitious gesture-influenced gaming system 100, the totals for the alternative symbol distribution are notable. While the overall return-to-player is the same as before (96.5%), the probability of a win for any given game is now much lower (0.0645 or over 1 in 15 spins). Correspondingly, the average win has gone up from 3.63 to 14.96, to counter for the increased rarity of a win.

This example shows that it is possible to have a game with two different symbol distributions, but with an identical pay table and return-to-player. As a feature of the superstitious gesture-influenced gaming system 100, certain classifications of gestures lead to one of a set of symbol distributions being chosen. These symbol distributions are characterized by having identical return-to-player but differing win frequency (also known as volatility).

In one embodiment, a player may play as normal in a low volatility setting, but by making a gesture, or a particular type of gesture (such as an aggressive sweep across the screen), the game would switch to using another, higher volatility setting with less frequent but higher wins. It should also be apparent that these techniques described above may be used in conjunction with other touch screen enabled devices such as the iDeck or top box displays. In the case of the iDeck, gestures to commence a game, such as pressing a particular virtual bet button, may be classified according to how much pressure was applied or how much finger movement was present at game start. These classifications may then be fed to the gesture logging system, as a means of influencing the game volatility, as described above.

Finally, it should be appreciated that the techniques described above with the superstitious gesture-influenced gaming system 100 lend themselves to being used with autostereoscopic displays and other 3-D display technology, as a means of enhancing an existing 2-D game for 3-D. In one such implementation, the final 3-D output is rendered into a number of views, using established methods giving the viewer the appearance of a display with real depth.

These methods do not necessarily require any change to the underlying game. The display modification aspects may be performed even by a Display Manager (DM) type video mixing device and retro-fitted to an existing unmodified game. By using the superstitious gesture-influenced gaming system 100, superstitious behavior by a player is given a better chance to be expressed, by the gaming machine responding in a pleasing manner. This may lead to better player enjoyment and more entertainment value.

In still other embodiments of the superstitious gesture-influenced gaming system 100, the player gesture or touch affects the actual game performance in a manner allowed by the relevant local gaming regulations (e.g., regulations relating to skill-based games in contrast to games of chance). Additionally, by implementing the superstitious gesture-influenced gaming system 100, players may achieve a better feeling of control of a game, without any real skill requirements. The preferred implementation may use the Alpha 2 system with multi-touch capability for enhanced gesture interaction.

In some embodiments, the superstitious gesture-influenced gaming system 100 utilizes a number of technologies that are built into a Virtual Button Deck. The Virtual Button Deck currently consists of an LCD screen with an associated touch screen and haptic feedback device. Haptic feedback enables a player to feel a physical vibration when their finger is in contact with the touch screen. The timing, amount, and type of feedback is typically controllable using appropriate software.

Most players enjoy feeling in control when playing a gaming machine. To this end, players often perform superstitious rituals such as rubbing the artwork of a gaming machine in a particular manner, or attempting to anticipate wins by "calling" them in advance. The superstitious gesture-influenced gaming system 100 attempts to provide a more enjoyable gaming experience by enhancing these activities. Additionally, the methods described herein are also combined with responsible gaming methods by increasing entertainment rather than reinforcing undesirable behavior.

Figure 10:
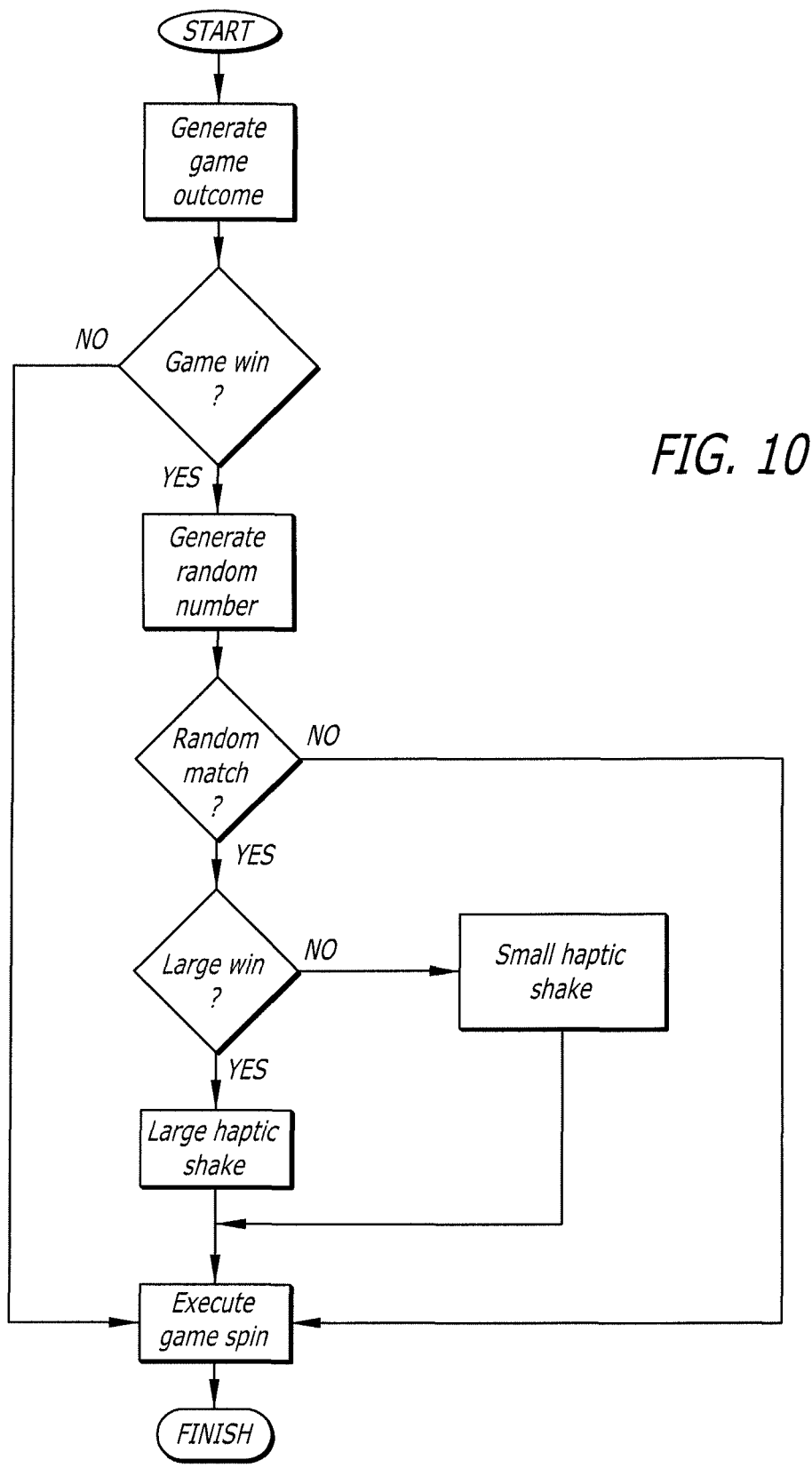
FIG. 10 illustrates a superstitious touch-gesturing system with a haptic enhanced win.

One aspect of the superstitious gesture-influenced gaming system 100 is shown in FIG. 10. In such an embodiment, the gaming machine is configured such that a player may always, or preferably sometimes, be alerted to an imminent win before the game cycle completes, in addition to normal haptic activity (such as responding to a touch on the virtual button deck with a short vibration).

Gaming machine software typically generates the outcome of a game at the point where the player executes an action such as, in the case of a reel spinning game, pressing a "Spin" button. Then, the reels are spun to the desired stopping positions, and any win is calculated and paid.

In the process of FIG. 10, once the outcome is generated (but before the reels start spinning), the outcome is used to determine if any win has occurred. If no win has occurred, the spin continues as normal. However, if a win has occurred, then a next preferable step occurs in which a random number is chosen between 0 and (N−1). N is chosen based on how often it is desired for the haptic effect to occur. In one scenario, an example value would be 2, which would mean that a haptic effect would occur 50% of the time. If the random number chosen is zero, then a haptic effect is triggered. A further test is done to set the amount of haptic vibration. For larger wins, it may be preferable to have a larger vibration.

The haptic vibration is then triggered, and the game spin commences. In an alternative implementation, the vibration is not triggered until some point within the game cycle, which makes the effect more pronounced. Regardless of when the vibration is triggered, the effect to the player is that over time the player associates the haptic effect with a win, and thus, the player has a much enhanced experience anticipating the win while the reels spin. In another embodiment in which haptic effects are not possible or desirable, the display is affected in a minor way, such as a horizontal video shake effect.

Figure 11:
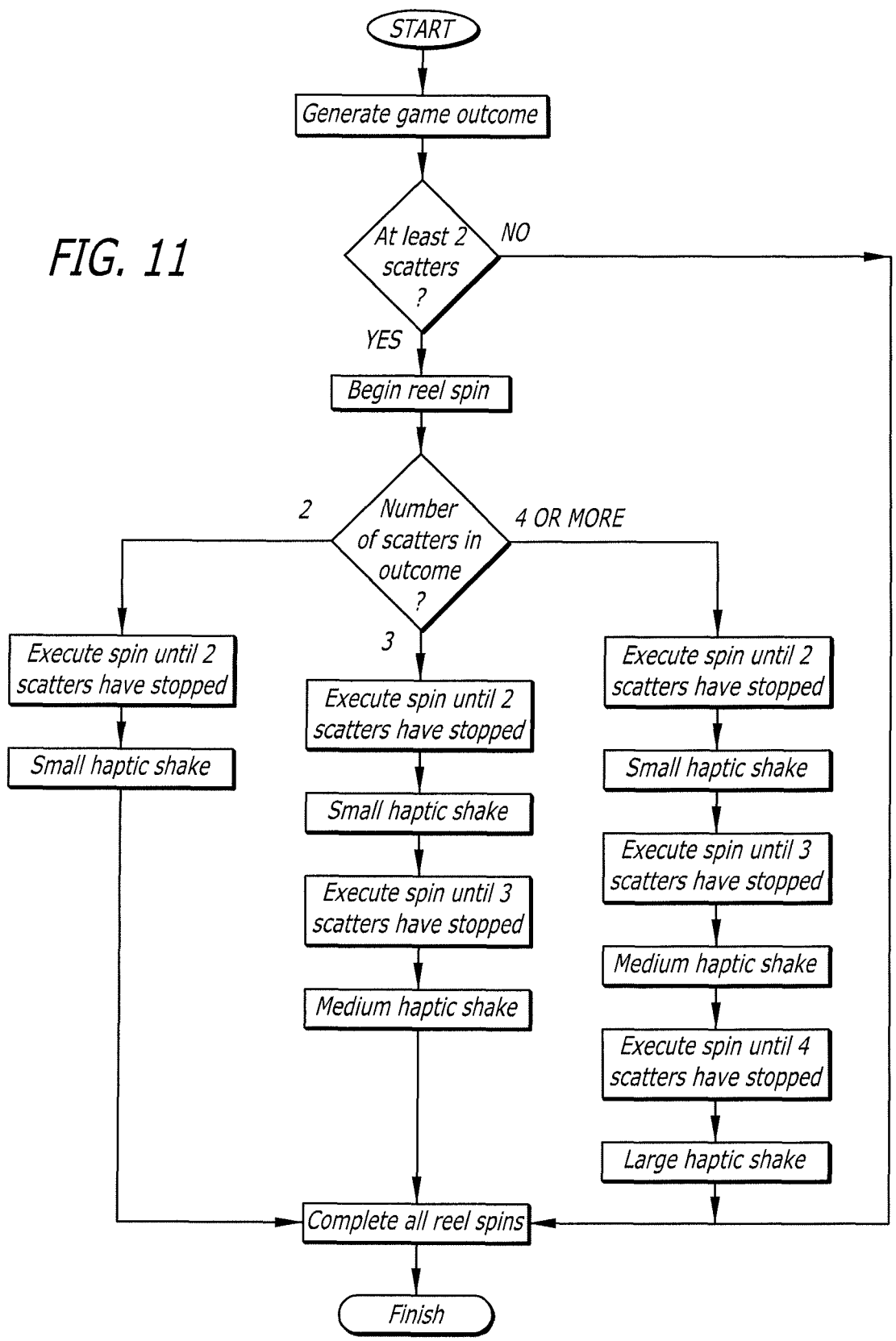
FIG. 11 illustrates a superstitious touch-gesturing system with a haptic enhanced free spin trigger.

FIG. 11 shows another process that takes advantage of a haptic response. This process is concerned with games that have a feature that is triggered by a player achieving a particular game result. In one embodiment, three, four, or five "scattered" symbols appear in the finishing combination.

Other gaming machines in the past have been configured such that once two scattered symbols have appeared in winning positions (but before all reels have completed spinning), the remaining reels spin for a longer period of time to build anticipation and draw attention to the possibility of a feature being triggered. Accordingly, in a 5-reel game in which the reels stop from left to right (reel 1 to 5), if after the first 3 reels have stopped there are already 2 visible scattered symbols, reels 4 and 5 continue to spin for an extended period compared to a normal spin time.

A potential drawback of this approach is that if "scatters" are fairly common on the left most reels, but not on the right most reels (a common method of designing games, to build this very anticipation with many 'near misses') then the average game cycle time can be adversely affected, thus resulting in a drop in corresponding throughput for the operator. If this situation occurs every 5 games, then the game cycle time is extended by 2 seconds. Accordingly, the average game cycle time would be extended by 0.4 seconds, which would drop overall throughput by 10%.

In contrast, the method shown in FIG. 11 does not increase game cycle time at all. Instead, a haptic response is triggered on the virtual button deck at the point when two scattered symbols appear on the first 4 stopping reels. A further response is triggered if a third symbol appears. Finally, an even larger response is triggered if a fourth symbol appears. As in FIG. 10, the game outcome is evaluated before the reels are spun to determine if any scatters are to appear.

It should be noted that in FIG. 11, when the number of scatters are counted, the count does not include the result from the final (right most) reel. This is so the response is only triggered if (from the player's perspective) there is some doubt about the final outcome.

Another superstitious feature that is common in Japanese "Pachislo" gaming machines is the ability for a player to stop each individual reel during game play. This feature has not previously been developed in North American gaming machines because it requires an extra set of physical buttons. Furthermore, Japanese machines enable players to extend the game cycle time indefinitely which, as described above, is detrimental to game performance.

Figure 12:
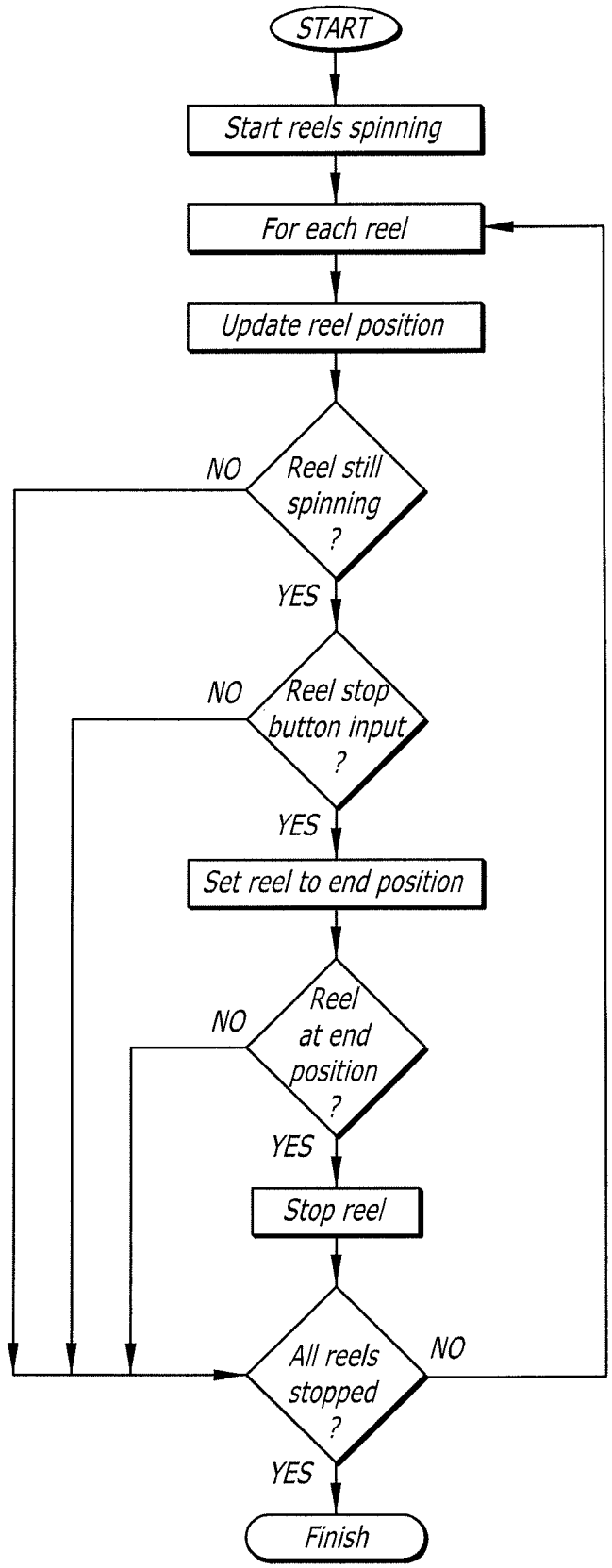
FIG. 12 illustrates a superstitious touch-gesturing system with a virtual button desk reel control process.
Figure 17:
FIG. 17 illustrates a superstitious touch-gesturing system with a virtual button desk reel control display.

However, in one embodiment shown in FIG. 17, the superstitious gesture-influenced gaming system 100 overcomes the above-described problem of needing dedicated buttons and enables a player to control the stopping of reels. FIG. 12 shows the process that is used to implement this aspect of the superstitious gesture-influenced gaming system 100. The player presses a "spin" graphic on the virtual button deck of the superstitious gesture-influenced gaming system 100 to commence the game. Once the reels are spinning, the display on the virtual button deck is replaced with that shown in FIG. 17. If a player does not press the deck, then the game continues to completion, taking the same time as normal. If, however, a player presses a virtual button associated with a reel, and the reel is still spinning, then that reel is stopped as quickly as possible. In the case of video-based games, the reel is stopped immediately.

The overall effect of this process is to enable a player to stop the reels in a particular "lucky" pattern (e.g., from right to left) or by using the multi-touch feature of the virtual button deck to stop more than one reel simultaneously. A player may stop the reels by simply dragging their finger across the virtual button deck. Using the process in FIG. 12, this causes the reels to appear to stop in sync with the player's finger movement.

In another embodiment of the superstitious gesture-influenced gaming system 100, a player is provided with areas of the virtual button deck associated with each reel. Prior to commencement of the game these areas are labeled "Reel 1," "Reel 2," and so forth. The player then simply presses each area in turn to start the corresponding reel spinning. In addition, a downward stroke across an area with a finger causes the corresponding reel to spin at an initial rate proportional to the velocity of the stroke. An upward stroke across the area causes the corresponding reel to spin in the opposite direction. All of these interactions do not affect the outcome of the game, but give the player an enhanced feeling of perceived control.

A further feature of the superstitious gesture-influenced gaming system 100 is that this system enables the reading of somewhat arbitrary gesture input to affect the way a game is displayed. As is noted above, some players are fond of performing superstitious gestures such as rubbing or touching certain artwork elements that are perceived to be lucky.

Figure 13:
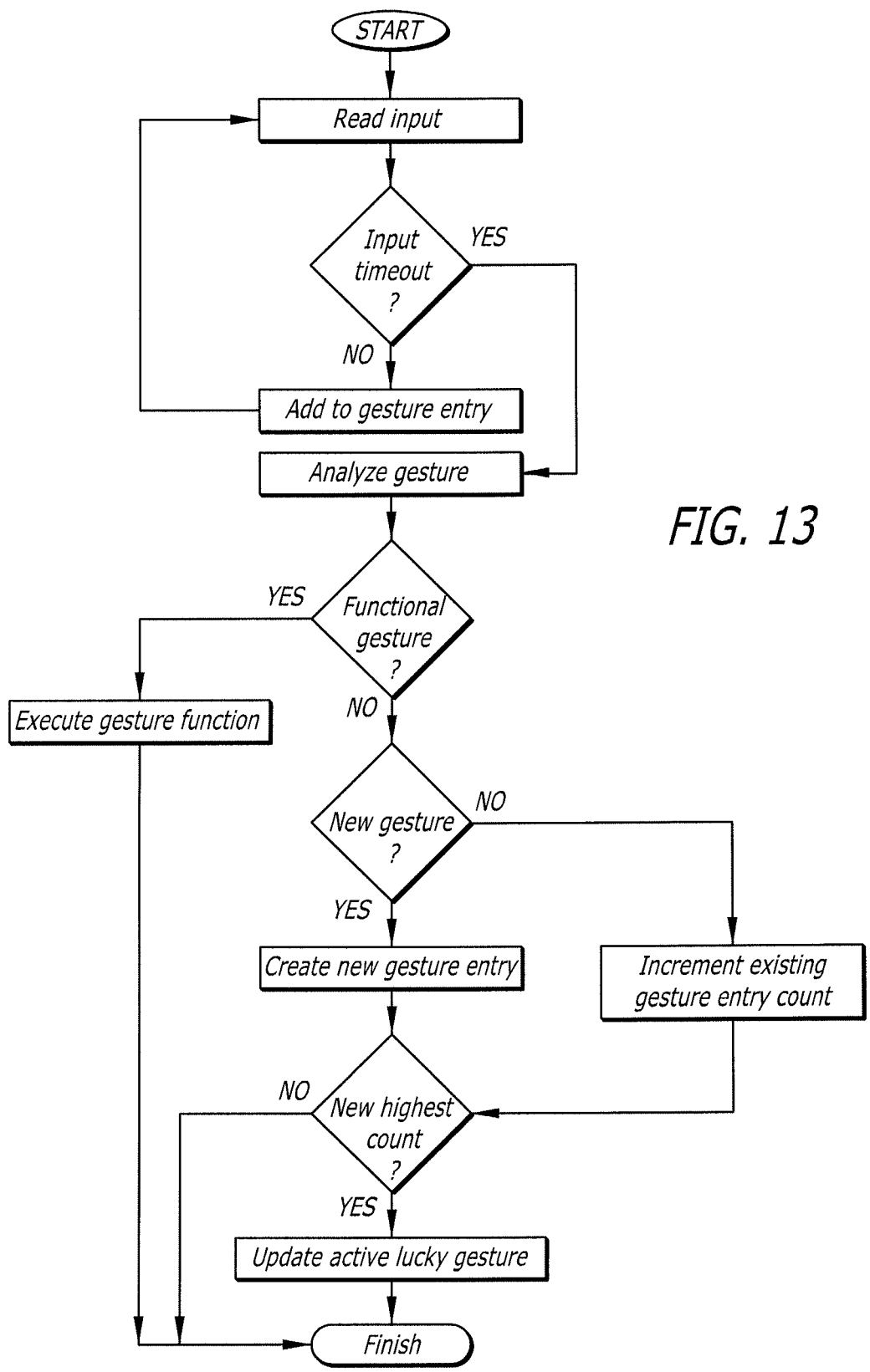
FIG. 13 illustrates a superstitious touch-gesturing system with accumulation of gesture data.

FIG. 13 illustrates a process for the accumulation of gesture data for a particular player. In this manner, gesture data is associated over a long period of time with a player by the use of player tracking accounts, or alternatively just for a single session for non-tracked players.

In FIG. 13, a gesture is read. A number of techniques could be used to perform this. First, a pre-set library of gestures could be stored and compared against the input. Second, a neural network function could be used to "learn" arbitrary gestures. Notably, however, in the superstitious gesture-influenced gaming system 100, the actual gesture learned need not be predictable. Whatever actions a player makes that are not directly related to conventional input may be used.

Figure 14:
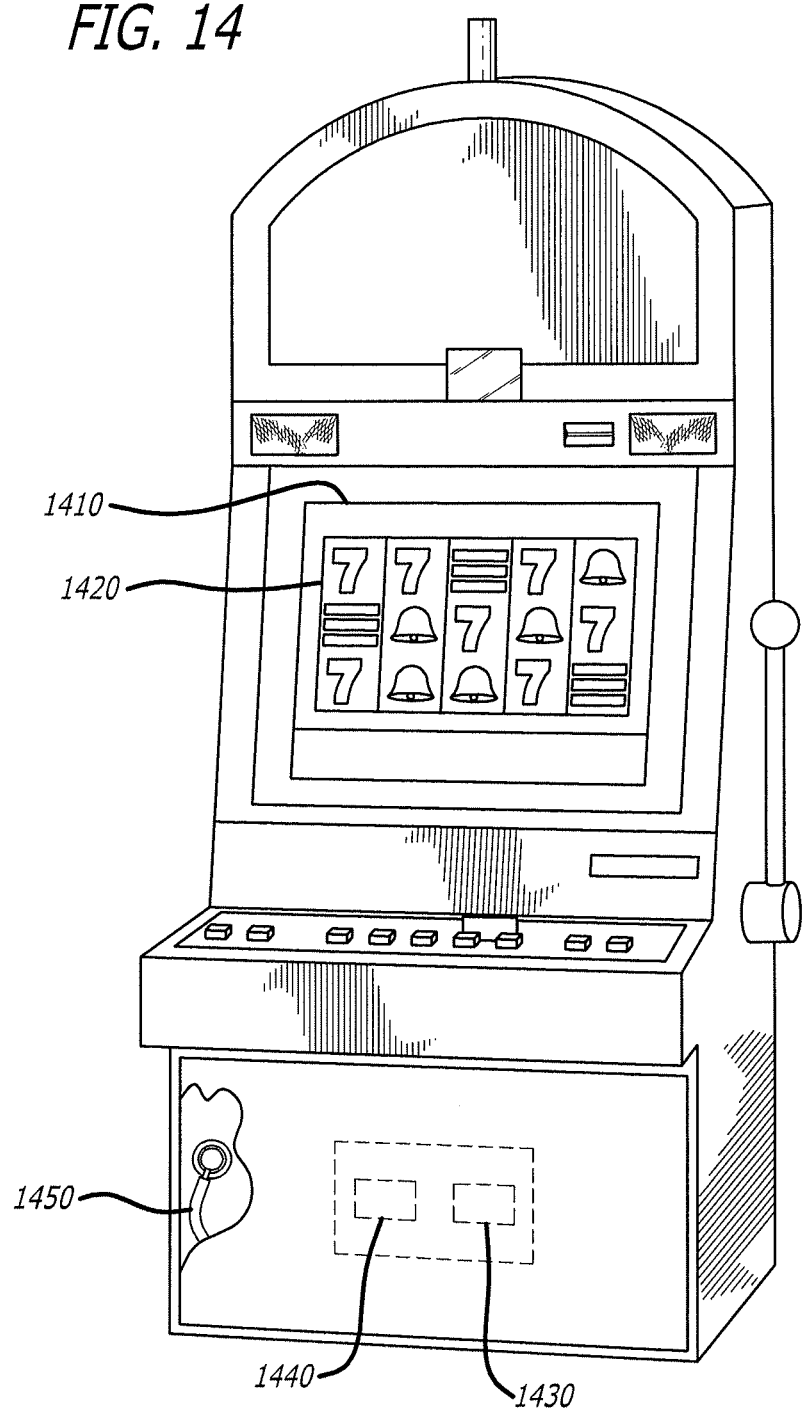
FIG. 14 illustrates a superstitious touch-gesturing system with an acoustic input gesture enabled cabinet.
Figure 15:
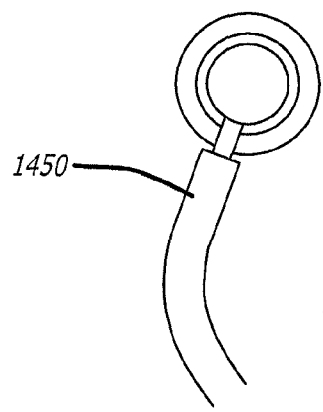
FIG. 15 illustrates a superstitious touch-gesturing system with an acoustic input sensor attached to the inside of the cabinet.

Another important method that may be used to read gestures in the superstitious gesture-influenced gaming system 100 is shown in FIG. 14 and FIG. 15. In this embodiment, a gesture-enhanced game play system 100 that includes a display system 1410, a sensor system 1420, a feedback system 1430, and one or more computing systems 1440 is disclosed. The display system 1410 is configured to display images related to one or more games to be played on at least a first game playing surface. The images include a virtual game layout including at least one area associated with the play of the one or more games. This method also uses an inexpensive stethoscope 1450 attached to a microphone, which in one embodiment of the superstitious gesture-influenced gaming system 100, that is mounted against the interior surface of the "belly" of the front side of the cabinet.

The sensor system 1420 is configured to detect at least one touch gesture when the touch gesture is at least proximate the virtual game layout. During play of the base game, when a player makes a touch gesture, the touch gesture is evaluated as either a direct gameplay touch gesture or an indirect gameplay touch gesture. Each direct gameplay touch gesture relates directly to reaching an outcome of a current game. Each indirect gameplay touch gesture may be associated with a feedback system that responds to the indirect gameplay touch gestures by the player with visual, audio, and/or tactile feedback. The feedback system 1430 enables indirect gameplay touch gestures by the player to altered game parameters by modifying a hit frequency and corresponding prize pay range, enabling the player to indirectly modify the hit frequency and prize pay range by making indirect gameplay touch gestures.

The one or more computing system 1440 communicatively are coupled to the display subsystem to control the images displayed by the display system. Additionally, the computing system 1440 is communicatively coupled to the sensor system 1420 to receive information indicative of the touch gesture sensed by the sensor system. The sensor system 1420 is configured to detect multiple touch gestures, wherein gestures include simultaneous touches by multiple fingers, consecutive touches by a single finger, touching and sliding of a finger, touching and sliding of multiple fingers, and combinations thereof.

Figure 16:
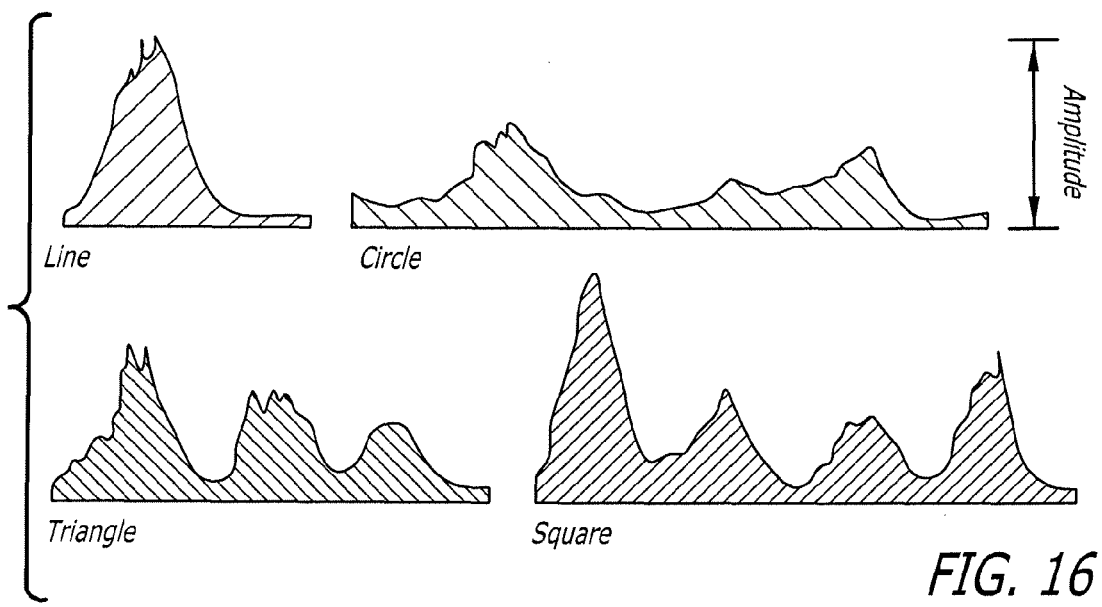
FIG. 16 illustrates an example of acoustic data taken from a superstitious touch-gesturing system.

As a player touches or drags their finger across the acoustically-enabled surface, a sound is made and picked up by the microphone. After filtering out low frequencies (<1200 Hz) to remove background noise such as music or speech, the sound is recorded and analyzed. Some examples of detectable gestures are shown in FIG. 16. As noted above, and in contrast to existing applications, it is not essential that accurate reading of gestures occurs. The applications described above and below do not require this. As such, arbitrary gestures may be learned by a neural network. In this manner, even if the gesture reading/interpretation reads a false positive (or negative), the outcome from the player's perspective is essentially random. Thus, while not directly reinforcing superstitious behavior, this system does not prevent the gaming machine from operating in a fair or undesired manner.

Notably, other incidental input from the player may also be used in place of gestures. For example, a microphone may be mounted to recognize a particular sound being made, or a camera could recognize a certain facial expression. The unifying factor is that whatever input is used, is not directly controlling the operation of the gaming machine. Instead, this input is used to influence small random elements, as is explained below.

Continuing the process in FIG. 13, after a potential gesture is read, the gesture is analyzed to determine if it is a functional gesture. Functional gestures are gestures that are used by the player to directly interact with the game, such as rubbing a virtual scratch-card to reveal a prize. If the gesture is a functional gesture, it is not used by the superstitious process and is passed to the existing methods for interpreting and executing the gesture.

If the gesture is non-functional, the table of known gestures is checked to see if it is a gesture that has not been used before. If the gesture has been used before, then the associated value in the gesture table is incremented. If the gesture has not been used before, then a new entry is made in the gesture table, with a value of 1. Once this is done, the table is checked to see if there is a change in the highest-valued gesture. If so, then the new highest-valued gesture is marked as being the current "Lucky" gesture that will be used by the methods below.

If the gestures are being generated by non-tracked players, it is beneficial to periodically remove from the table any gestures that have not been made for a period of time, (e.g., the last hour). This ensures that a particular player is able to easily associate their gesture as "lucky."

Once superstitious gestures are detected and designated as "lucky," another aspect of the superstitious gesture-influenced gaming system 100 comes into play. In this aspect, the gestures are used to influence game play. As noted above, these influences are generally expected to be neural with regards to game performance. Instead, the influence is designed to give the impression of the player affecting the game output, without actually making any effective difference.

Figure 18:
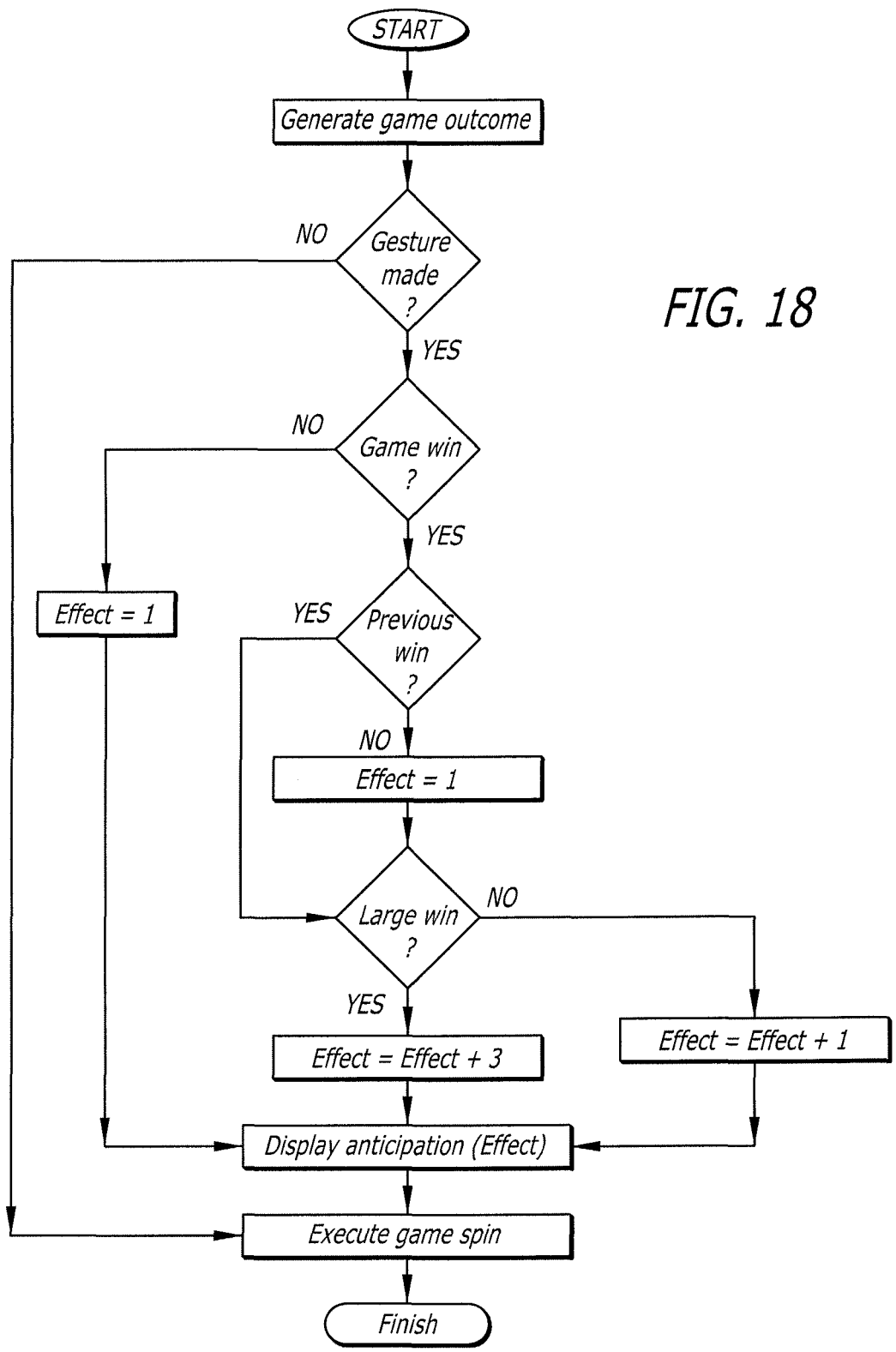
FIG. 18 illustrates a superstitious touch-gesturing system with gesture-based win anticipation.

An example of such an effect is shown in FIG. 18 of the superstitious gesture-influenced gaming system 100. When the player presses the "spin" button to commence a game, the software checks whether the "lucky" gesture was made in the time period after the commencement of the previous game. If the gesture was not made during this time period, the game is displayed as normal.

If a gesture was made, then the display of the game is affected. In one embodiment of the superstitious gesture-influenced gaming system 100, the amount of effect is determined by: (1) if the game is to result in a win; (2) the size of the win; and (3) whether the player had previously won an award. Preferably, this procedure tests to see if the previous game also resulted in a win, and thus, the player is having a lucky "streak." However, this technique may also be applied to wins over a longer period of time, such that a number of large wins interspersed with losses would still produce a large effect.

Figure 19:
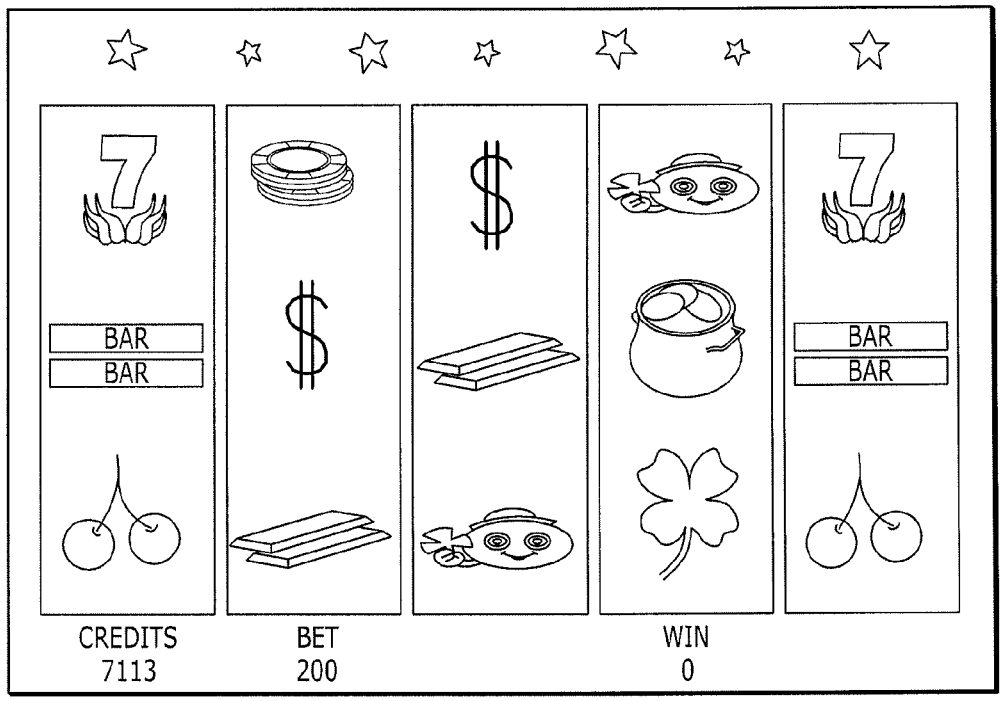
FIG. 19 illustrates a superstitious touch-gesturing system displaying a minor response to a superstitious gesture.
Figure 20:
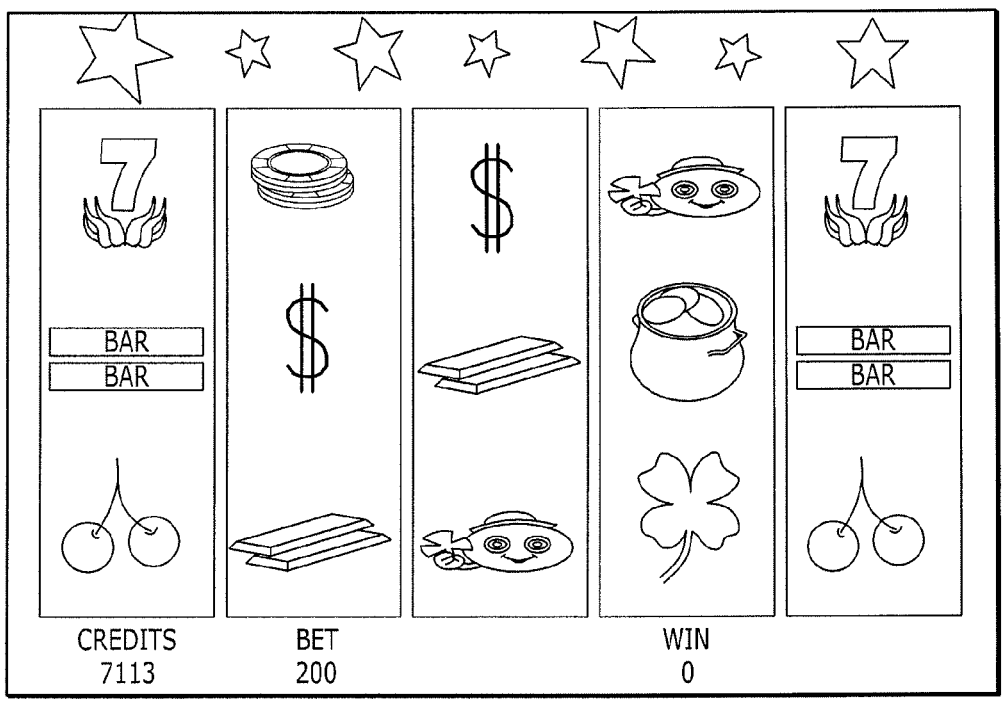
FIG. 20 illustrates a superstitious touch-gesturing system displaying a major response to a superstitious gesture.
Figure 21:
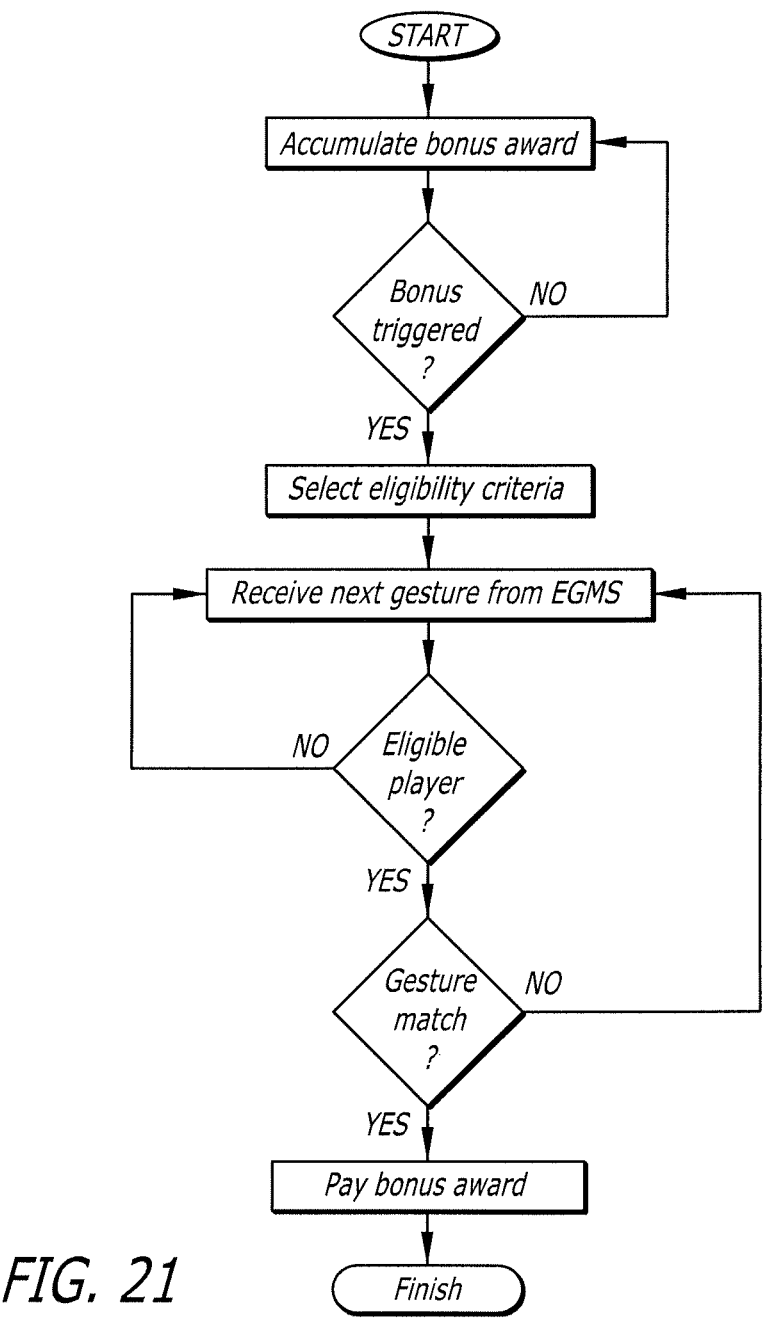
FIG. 21 illustrates a superstitious touch-gesturing system with a bonus awarded to a superstitious gesture.
Figure 22:
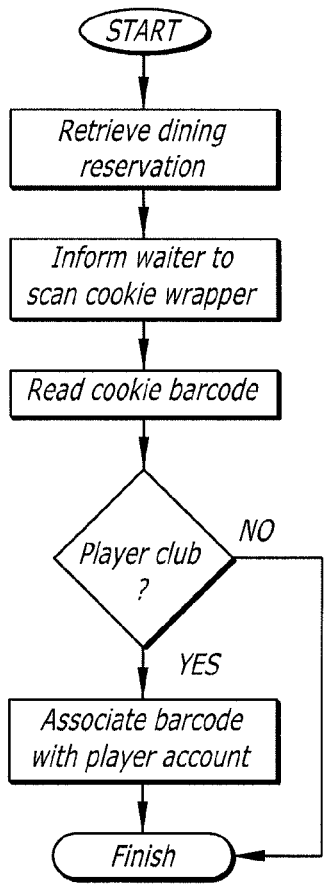
FIG. 22 illustrates a superstitious touch-gesturing system with a generation of a fortune cookie.
Figure 23:
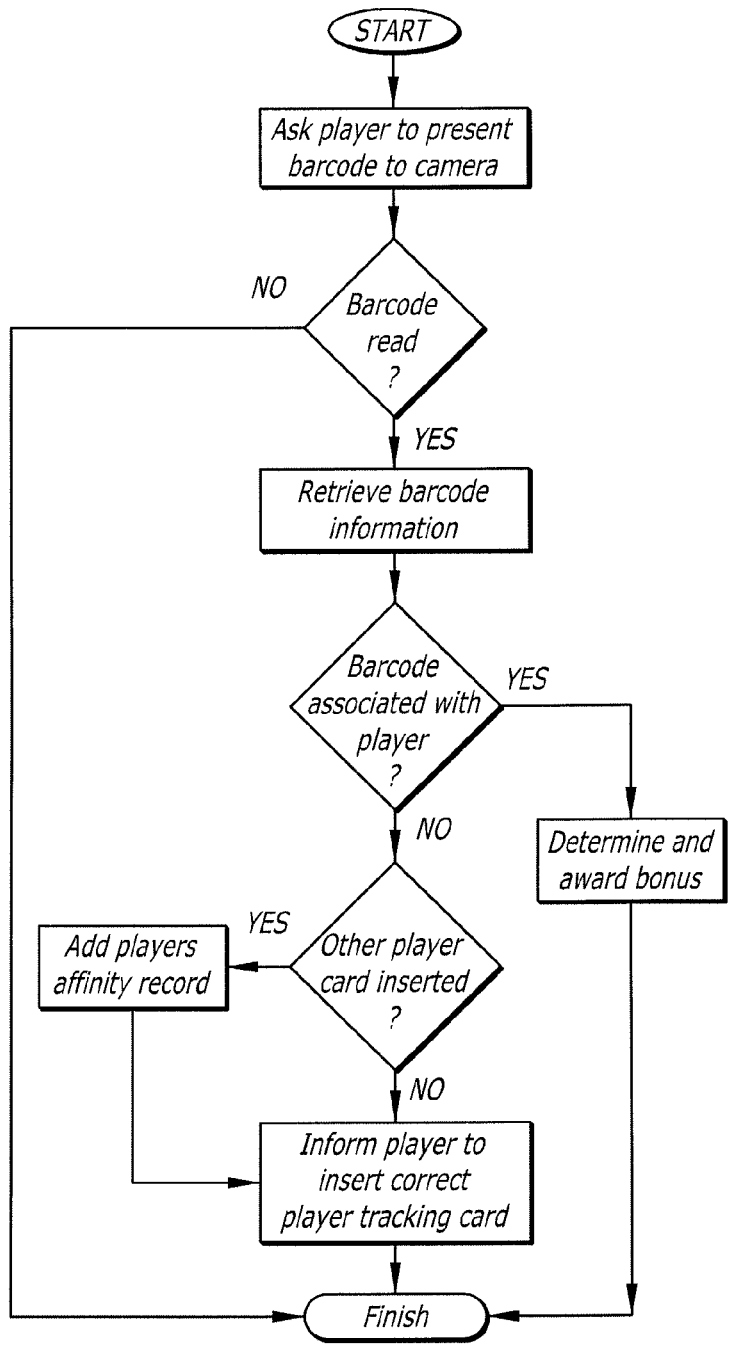
FIG. 23 illustrates a superstitious touch-gesturing system with a retrieval of a fortune cookie.
Figure 24:
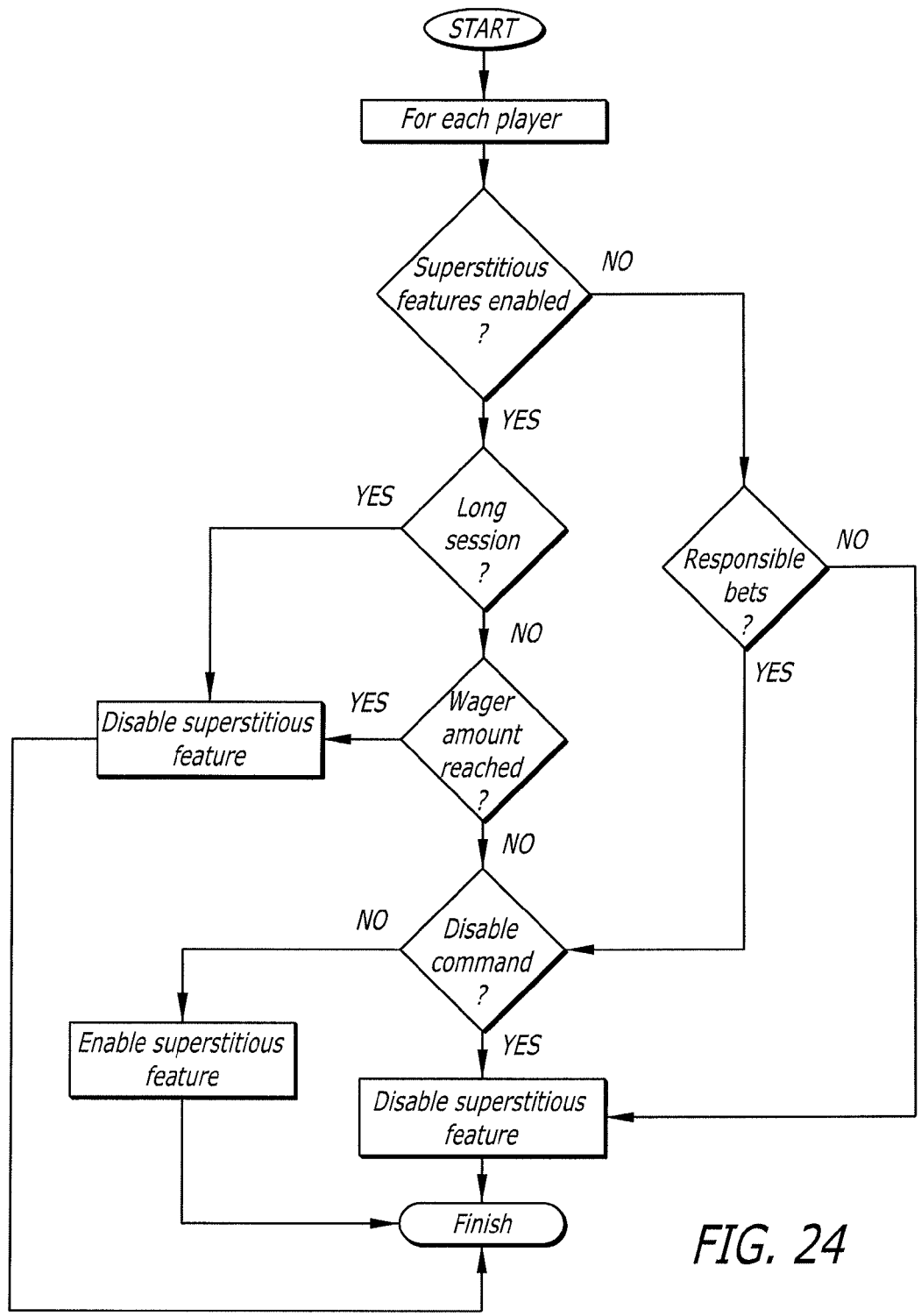
FIG. 24 illustrates a superstitious touch-gesturing system with responsible enabling and disabling of superstitious features.

An example of a possible effect is shown in FIGS. 19 and 20. In this embodiment, a number of star graphical images are shown across the top of the gaming video display. If a player has made a lucky gesture, these images appear as the reels spin. The size of the stars is determined by the process in FIG. 18, with a suitable maximum enforced.

From a player's perspective, when the player makes a superstitious gesture (e.g., rubbing a genie's lamp on the cabinet artwork), the player sees the game output change in response. If the game results in a win, then in advance of the win, the player sees a larger "effect," which reinforces the superstitious behavior.

Referring now to FIG. 12, an alternative process is shown that awards bonuses to players for the correct input of a gesture. It is important to note that this bonus amount is in addition to normal payout and may be used as a method of rewarding players that are making the largest bets.

In FIG. 12, a bonus is accumulated by conventional means (e.g., by coin in), or by some use of the casino's marketing budget. At the point when the bonus is triggered (i.e., when it reaches a pre-set trigger amount), a decision is made as to the eligibility for the bonus. These criteria may be used to restrict the bonus to a set of players that have made a pre-set amount of wagering in the previous time period, or to players of a certain reward level in the player's club. In some embodiments, further criteria may be to restrict the bonus to players making a particular type of gesture. Thus, while players may not be aware of these parameters, in one time period the gesture that must be made is a circular one, while in another time period, the gesture is a "straight line."

In one embodiment of the superstitious gesture-influenced gaming system 100, once eligibility is determined, the bonus controller receives gesture data from each gaming machine that is eligible. The first eligible player to make the correct gesture wins the bonus prize, which may be awarded as a conventional mystery feature.

In another embodiment of the superstitious gesture-influenced gaming system 100, a force-sensitive touchscreen may also be used to further enhance superstitious behavior by adjusting non-essential game characteristics, such as reel spin velocity. For example, a player making a hard press on the touchscreen sees the reels spin faster, and stop in a more aggressive manner than another player making a soft press. In one such embodiment, neither player would have a different overall game cycle time (i.e., the increase of velocity would be offset with a corresponding increase in the amount of rotation of the spinning reels). Preferably, this action would be performed in a video reel spin, but it is also applicable to physical spinning reels.

A further feature of the superstitious gesture-influenced gaming system 100 is shown in FIGS. 13 and 14. In one such embodiment, a common item given to customers at the end of the meal, in conjunction with the check, is a fortune cookie. The fortune cookie includes a slip of paper, often containing a selection of random lottery numbers.

In one embodiment of the superstitious gesture-influenced gaming system 100, the slip of paper also includes a code, preferably a barcode, but also potentially a code that could be entered by a player. The packaging for the cookie also includes a barcode. Before the waiter delivers the cookie, he or she scans the external barcode (which matches the barcode on the slip inside the cookie). This associates the cookie barcode with the dining check, and potentially (if the player presented their player tracking card at the commencement of the meal) with the particular player.

In such an embodiment, when the diner opens the cookie, they see a barcode on the slip of paper. Instructions may also be given on the slip, or alternatively written on the check or other informational material. In an alternative implementation, the barcode is on the check rather than the cookie. The instructions tell the player to use the barcode at a particular game or type of game. When the player does so (as shown in FIG. 14), a bonus feature may be activated that may give the player bonus credits, a prize, or maybe just a particular fortune cookie text.

The superstitious gesture-influenced gaming system 100 incentivizes players in a restaurant to go to a gaming machine (or potentially even a particular gaming machine playing a specific game) that is being currently promoted. It is expected that by doing so they may enjoy the bonus feature and thus continue playing.

The above aspects of superstitious gesture-influenced gaming system 100 are aimed at increasing entertainment and enjoyment of gaming. It is also recognized that reinforcing superstitious behavior should be done in a responsible manner. To this end, FIG. 15 describes a process for the controlling of the enablement and disablement of superstitious features, such that it is only used for increasing entertainment and not for encouraging irresponsible gaming behavior.

First, each player may elect not to participate in superstitious behavior. To do so, the player or the operator may mark their account with a "disable" command that ensures that superstitious features are never enabled. Second, the operator can set session lengths, after which no further superstitious features would be enabled. Third, the operator may set amounts of wager (either on a per game basis, or over a period of time) after which the superstitious feature is disabled. Finally, superstitious features may be re-enabled if responsible activity has recommenced (i.e., the wagering amount has decreased) or there has been a break in the session.

It is also possible with some of the features described above, that when superstitious features are disabled, they are replaced with totally random versions of the same, which are not influenced by gestures or other player involvement. This decreases the players feeling of control and can be used as a means of ensuring that the superstitious features are used only for entertainment.

In a preferred implementation of the superstitious gesture-influenced gaming system 100, the system may include a multi-touch virtual button deck, an Acoustic Scratch Input, and/or a neural network. In one embodiment of the multi-touch virtual button deck, the touchscreen can interpret force, such as that produced by Touchco. This technology used interpolating force-sensitive resistance, which is incorporated into displays and can be completely transparent. One particular type of Acoustic Scratch Input is developed by Carnegie Mellon University, which is located at 5000 Forbes Ave., Pittsburgh, Pa. 15213.

Continuing, one non-limiting example of a Neural Network, is described herein. Neural network software is software which can acquire, store, and utilize experiential knowledge. Regarding mouse gestures, a multilayer perception and standard back-propagation algorithm may be used for training. A significant issue is the representation of an input data for neural network. In one embodiment, a mouse path is transformed into a vector of cosines and sines. See the following example below:
path {170:82 172:83 175:85 177:86 . . . }
transformed into
vector {0.45 0.55 0.45 0.71 0.89 0.83 0.89 0.71 . . . }
Recognition Algorithm:
(1) record a mouse path; (2) smooth a path to a base points; (3) transform points to angles' vector; (4) compute sines and cosines; (5) pass values (cosines and sines) to network's inputs; (6) apply softmax function on an output network vector; and (7) find and verify a winner.
Neural Network Architecture:
(1) input layers: 32 synapses; (2) hidden layer: 32 neurons; (3) output layer: 29 axons (one for each gesture); (4) fully connected layers; (5) transfer function: log-sigmoid; (6) incremental training algorithm, standard back-propagation method; (7) momentum, variable learning rate (slowly reduced); and (8) input noise.

In one embodiment, before testing the recognition ability, the network should be trained (or "N" file image of trained net may be loaded). Parameters of the training process may be customized, namely: maximum number of cycles, a momentum value, a learning rate, a minimum value of mean square error (in other words "target error"). The training process stops after achieving either of these conditions: maximum number of cycles or target error. During the training process one should keep an eye on an error's graph, a current gesture (with noise), and a 2-D network presentation.

As soon as the network has been trained, it may be tested. In one embodiment, the patterns (or test all of them), a speed value, and a noise level are selected. Additionally, it is recommended to familiarize oneself with ideal presentation of gestures via setting minimal noise and minimal speed.

In some embodiments, one presses the right mouse button during moving a mouse for recognition of mouse gestures. For example, for recognition of a "left" gesture, press right mouse button and move a mouse to the left. If a neural network can recognize the gesture, then the name, probability and ideal presentation of the winner is shown. In one embodiment, the mouse path must have at least 16 points. Notably, the direction is very important.

Continuing, in another aspect of one embodiment, the network may be trained to recognize the gestures, but not the 2-D images. Hence, one may draw the "circle" gesture a thousand different ways, but the only "valid" way is to press the mouse button and move a mouse to the right and down. Again, this is a gesture, and not a 2-D image.

In some preferred embodiments of the superstitious gesture-influenced gaming system 100, the capabilities of the system include: (1) an enhanced feeling of control of the game by the player, without affecting game performance; (2) a more exciting anticipation of wins, without slowing the game down; (3) the novel uses of a virtual button deck to provide control of the game and game features; (4) the use of any surface of the gaming machine for gesture input; (5) the use of arbitrary gestures, without the need for a player to learn a particular gesture; and (6) responsible methods of delivering superstitious features in an entertainment-only environment.

The various embodiments described above are provided by way of illustration only and should not be construed to limit the claimed invention. Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed:

1. A gesture enhanced game play system, comprising:
a display system configured to display images related to one or more games to be played on at least a first game playing surface, the images including a virtual game layout including at least one area associated with the play of the one or more games;
a sensor system configured to detect at least one touch gesture when the touch gesture is at least proximate the virtual game layout;
wherein during play of the base game, when a player makes a touch gesture the touch gesture is evaluated by the sensor system as either a direct gameplay touch gesture or an indirect gameplay touch gesture, wherein if the touch gesture is an indirect gameplay touch gesture, then a gesture table of known indirect gameplay touch gestures is accessed and an associated value in the gesture table is incremented, wherein the indirect gameplay touch gesture with the highest associated value is designated as a lucky gesture, and wherein if the lucky gesture is made by a player during gameplay of a winning game, then the player receives an additional award or enhanced award presentation;
wherein the feedback system enables indirect gameplay touch gestures by the player to altered game parameters by modifying a hit frequency and corresponding prize pay range, enabling the player to indirectly modify the hit frequency and prize pay range by making indirect gameplay touch gesture; and
a computing system, the computing system communicatively coupled to the display system to control the images displayed by the display system, the computing system communicatively coupled to the sensor system to receive information indicative of the touch gesture sensed by the sensor system.

2. The system of claim 1, wherein the indirect gameplay touch gestures are associated with a feedback system that responds to the indirect gameplay touch gestures by the player with visual, audio, or tactile feedback.

3. The system of claim 1, wherein indirect gameplay touch gestures may activate the feedback system when a symbol touched, a general area of the display system is touched, a graphic is touched, or an area within a proximity of a symbol or graphic is touched.

4. The system of claim 1, wherein a game that has a higher bonus hit frequency has a lower prize pay range and a game that has a lower hit frequency has a higher prize pay range, and wherein making gesture motions does not change an overall return to the player of the game.

5. The system of claim 1, wherein the indirect gameplay touch gestures correlate to a database of predetermined indirect gameplay touch gestures in the feedback system that associate each indirect gameplay touch gesture with a predetermined feedback to the player.

6. The system of claim 1, wherein an indirect gameplay touch gesture is identified by the feedback system a set number of times before the feedback system associates the indirect gameplay touch gesture with a predetermined feedback to the player.

7. The system of claim 1, wherein an indirect gameplay touch gesture is identified by the feedback system that associates the indirect gameplay touch gesture with a predetermined feedback to the player, and wherein the feedback to the player is personalized for each specific player in response to receiving player identification information.

8. The system of claim 1, wherein the system includes a virtual button having an available state which demonstrates that sufficient credits are available to enable selection of the button in its available state.

9. The system of claim 1, wherein the system includes a virtual button having an inactive button state which demonstrates that sufficient credits are not available to enable selection of the button in its inactive state.

10. The system of claim 1, wherein the system includes a virtual button having a mouse/finger over button state, wherein if a player touches and slides from one button location to another button location, a potential button/selection is activated, but a selection is not committed by the player without a secondary player action.

11. The system of claim 1, wherein the system further includes a sound effects package that synchronizes sound effects with use of a physical button or virtual button.

12. The system of claim 6, wherein lower frequency tones are associated with lower bet amounts and higher frequency tones are associated with higher bet amounts.

13. The system of claim 1, wherein the display subsystem includes at least one display device selected from the group consisting of a cathode ray tube display, a liquid crystal (LCD) display, a liquid crystal on silicon (LCOS) display, a plasma display, a digital light processing (DLP) display or a projector.

14. The system of claim 1, further comprising at least a first game playing surface on which at least a portion of the one or more games is playable, the first game playing surface forming a portion of a table top or a bar top.

15. The system of claim 1, further comprising at least a first game playing surface on which at least a portion of the one or more games is playable, and wherein the first game playing surface is part of a slant top or vertical gaming machine.

16. The system of claim 1, further comprising:
at least a first game playing surface on which at least a portion of the one or more games is playable; and
at least a second game playing surface on which at least a portion of the one or more games is playable, where the sensor subsystem is configured to detect at least one physical aspect of the at least one game-related piece when the game-related piece is located on the first game playing surface and when the game-related piece is located on the second game playing surface.

17. The system of claim 1, further comprising:
at least a first game playing surface on which at least a portion of the one or more games is playable; and
at least a second game playing surface on which at least a portion of the one or more games is playable, wherein the display subsystem includes a first display device and at least a second display device, the first display device positioned to display the images on or under the first game playing surface and the second display device positioned to display the images on or under the second game playing surface.

18. The system of claim 1, wherein the computing subsystem is configured to cause the display subsystem to display the virtual game layout at a different orientation than previously displayed between portions of the games.

19. The system of claim 1, wherein the display subsystem and the sensor subsystem are remotely located from the computing subsystem.

20. The system of claim 1, wherein the display subsystem and the sensor subsystem are located in a wireless communications device.

21. The system of claim 1, wherein the display subsystem and the sensor subsystem are co-located remotely from a gaming floor of a gaming premises.

22. The system of claim 1, wherein the virtual game layout comprises a casino table game.

23. The system of claim 1, wherein the at least one computing subsystem controls the display subsystem to display images of a menu including icons representing a number of items that may be ordered.

24. The system of claim 1, wherein the at least one computing subsystem controls the display subsystem to display images indicative of participant account information for at least one participant in the at least one game.

25. A gesture enhanced game play system, comprising:
a display system configured to display images related to one or more games to be played on at least a first game playing surface, the images including a virtual game layout including at least one area associated with the play of the one or more games;
a sensor system configured to detect at least one touch gesture when the touch gesture is at least proximate the virtual game layout;
wherein during play of the base game, when a player makes a touch gesture the touch gesture is evaluated by the sensor system as either a direct gameplay touch gesture or an indirect gameplay touch gesture, and if the touch gesture is an indirect gameplay touch gesture, then an associated value in a gesture table is incremented, wherein the indirect gameplay touch gesture with the highest associated value is designated as a lucky gesture, and wherein if the lucky gesture is made by a player during gameplay of a winning game, then the player receives an additional award or enhanced award presentation; and
a computing system, the computing system communicatively coupled to the display system to control the images displayed by the display system, the computing system communicatively coupled to the sensor system to receive information indicative of the touch gesture sensed by the sensor system.

26. A gesture enhanced game play system, comprising:
a display system configured to display images related to one or more games to be played on at least a first game playing surface, the images including a virtual game layout including at least one area associated with the play of the one or more games;
a sensor system configured to detect at least one touch gesture when the touch gesture is at least proximate the virtual game layout;
wherein during play of the base game, when a player makes a touch gesture the touch gesture is evaluated by the sensor system as either a functional gesture or an arbitrary non-functional gesture, if the touch gesture is an arbitrary non-functional touch gesture, then a gesture table of known non-functional touch gestures is checked to see if the non-functional gesture has been used before, wherein if the non-functional touch gesture has been used before, an associated value in the gesture table is incremented, while if the non-functional touch gesture has not been used before, a new entry is made in the gesture table,
wherein the gesture table is checked to determine a highest-valued non-functional touch gesture, wherein the highest-valued non-functional touch gesture is designated as a lucky gesture, and wherein if the lucky gesture is made by a player during gameplay of a winning game, the player receives an additional award or enhanced award presentation; and a computing system, the computing system communicatively coupled to the display system to control the images displayed by the display system, the computing system communicatively coupled to the sensor system to receive information indicative of the touch gesture sensed by the sensor system.

27. The system of claim 26, wherein the non-functional touch gestures are classified according to how much pressure was applied by the player.

28. The system of claim 26, wherein the non-functional touch gestures are classified according to how much finger movement was used by the player.

29. The system of claim 26, wherein the non-functional touch gestures are associated with a feedback system that responds to the non-functional touch gestures by the player with visual, audio, or tactile feedback.

30. The system of claim 26, wherein non-functional touch gestures may activate the feedback system when a symbol is touched, a general area of the display system is touched, a graphic is touched, or an area within a proximity of a symbol or graphic is touched.

31. The system of claim 26, wherein a game that has a higher bonus hit frequency has a lower prize pay range and a game that has a lower hit frequency has a higher prize pay range, and wherein making gesture motions does not change an overall return to the player of the game.

32. The system of claim 26, wherein the non-functional touch gestures correlate to a database of predetermined non-functional touch gestures in the feedback system that associate each non-functional touch gesture with a predetermined feedback to the player.

33. The system of claim 26, wherein a non-functional touch gesture is identified by the feedback system a set number of times before the feedback system associates the non-functional touch gesture with a predetermined feedback to the player.

34. The system of claim 26, wherein a non-functional touch gesture is identified by the feedback system that associates the non-functional touch gesture with a predetermined feedback to the player, and wherein the feedback to the player is personalized for each specific player in response to receiving player identification information.

* * * * *